(12) United States Patent
Chou et al.

(10) Patent No.: US 11,076,176 B2
(45) Date of Patent: Jul. 27, 2021

(54) MULTIPLE TRANSCODE ENGINE SYSTEMS AND METHODS

(71) Applicant: Apple Inc., Cupertino, CA (US)

(72) Inventors: Jim C. Chou, San Jose, CA (US); Syed Muhammad A. Rizvi, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/711,189

(22) Filed: Dec. 11, 2019

(65) Prior Publication Data

US 2020/0120362 A1 Apr. 16, 2020

Related U.S. Application Data

(63) Continuation of application No. 15/274,045, filed on Sep. 23, 2016, now Pat. No. 10,523,973.

(51) Int. Cl.
| | |
|---|---|
| *H04N 19/91* | (2014.01) |
| *H04N 19/156* | (2014.01) |
| *H04N 19/174* | (2014.01) |
| *H04N 19/436* | (2014.01) |
| *H04N 19/127* | (2014.01) |

(52) U.S. Cl.
CPC .......... *H04N 19/91* (2014.11); *H04N 19/127* (2014.11); *H04N 19/156* (2014.11); *H04N 19/174* (2014.11); *H04N 19/436* (2014.11)

(58) Field of Classification Search
CPC ...... H04N 19/91; H04N 19/184; H04N 19/50; H04N 19/40; H04N 19/13

USPC ........................................ 375/240.12, 240.24
See application file for complete search history.

(56) References Cited

U.S. PATENT DOCUMENTS

| | | |
|---|---|---|
| 2014/0119457 A1* | 5/2014 | MacInnis ............... H04N 19/40 375/240.26 |
| 2015/0023409 A1 | 1/2015 | Schierl et al. |
| 2015/0146794 A1 | 5/2015 | Hoang |
| 2015/0271510 A1 | 9/2015 | Wen et al. |
| 2015/0271531 A1 | 9/2015 | Wen et al. |
| 2016/0007050 A1 | 1/2016 | Rusert et al. |

* cited by examiner

*Primary Examiner* — On S Mung
(74) *Attorney, Agent, or Firm* — Fletcher Yoder, P.C.

(57) ABSTRACT

Systems and methods for improving determination of encoded image data using a video encoding pipeline, which includes a first transcode engine that entropy encodes a first portion of a bin stream to determine a first bit stream including first encoded image data that indicates a first coding group row and that determines first characteristic data corresponding to the first bit stream to facilitate communicating a combined bit stream; and a second transcode engine that entropy encode a second portion of the bin stream to determine a second bit stream including second encoded image data that indicates a second coding group row while the first transcode engine entropy encodes the first portion of the bin stream and that determines second characteristic data corresponding to the second bit stream to facilitate communicating the combined bit stream, which includes the first bit stream and the second bit stream, to a decoding device.

20 Claims, 12 Drawing Sheets

MULTIPLE TRANSCODE ENGINE SYSTEMS AND METHODS

CROSS-REFERENCE TO RELATED APPLICATIONS

This application is a continuation of and claims priority to U.S. patent application Ser. No. 15/274,045, filed on Sep. 23, 2016, and entitled "MULTIPLE TRANSCODE ENGINE SYSTEMS AND METHODS," which is incorporated by reference herein in its entirety for all purposes.

BACKGROUND

The present disclosure relates generally to image data encoding and, more particularly, to transcode engines used to entropy encode image data.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more image frames based on image data. For example, such electronic devices may include computers, mobile phones, portable media devices, tablets, televisions, virtual-reality headsets, and vehicle dashboards, among many others. Since image data may be received from another electronic device and/or stored in the electronic device, the image data may be encoded (e.g., compressed) to reduce size (e.g., number of bits) and, thus, resources (e.g., transmission bandwidth and/or memory addresses) used to transmit and/or store image data. To display image frames, the electronic device may decode encoded image data and instruct the electronic display to adjust luminance of display pixels based on the decoded image data.

To facilitate encoding, a prediction encoding process may be used to compress image data. For example, a prediction encoding process may compress a portion of the image data by referencing another portion of the image data, thereby generating prediction encoded image data including symbols (e.g., syntax elements) that indicate the relationship between the portions of the image data. Additionally, an entropy encoding process may compress the prediction encoded image data by indicating the symbols based on frequency of occurrence in the prediction encoded image data. In this manner, the entropy encoding process may further compress the image data by generating entropy encoded image data that indicates more frequently occurring symbols using fewer bits.

In some instances, image data may be captured for real-time or near real-time display and/or transmission. For example, when an image sensor (e.g., digital camera) captures image data, an electronic display may shortly thereafter display image frames based on the captured image data. Additionally or alternatively, an electronic device may shortly thereafter transmit the captured image data to another electronic device and/or a network. As such, the ability to display and/or transmit in real-time or near real-time may be dependent at least in part on output rate of encoded image data. However, in some instances, image data throughput of the prediction encoding process and image data throughput of the entropy encoding process may vary, which may limit output rate of encoded image data.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to improving determination of encoded image data, for example, by improving output rate of encoded image data to facilitate real-time or near real-time display and/or transmission. In some embodiments, a video encoding pipeline may generate encoded image data by compressing (e.g., encoding) source image data, for example to facilitate improving data storage efficiency and/or data transmission efficiency. To compress source image data, the video encoding pipeline may prediction encode the source image data to determine prediction encoded image data. In some embodiments, the prediction encoded image data may include prediction encoding parameters that indicate image data in one coding group (e.g., coding tree unit, coding unit, or macroblock) with reference to image data in another coding group.

Additionally, in some embodiments, the video encoding pipeline may determine filtering parameters expected to improve quality of decoded image data when applied by a decoding device. In some embodiments, the prediction encoding parameters and/or the filtering parameters may be indicated using one or more symbols (e.g., syntax elements). To facilitate further compression, the video encoding pipeline may entropy encode the symbols to determine encoded image data, which may subsequently be stored and/or transmitted.

To enable real-time or near real-time display and/or transmission, the video encoding pipeline may output encoded image data at a target output rate. However, in some instances, entropy encoding may be relatively non-deterministic while prediction encoding and/or determination of filtering parameters is relatively deterministic. As such, in some instances, entropy encoding may present a bottleneck that limits output rate of encoded image data.

Accordingly, the present disclosure provides techniques to improve entropy encoding throughput. In some embodiments, the video encoding pipeline may implement entropy encoding using multiple transcode engines that each processes a different coding group relatively in parallel. For example, a first transcode engine may entropy encode coding groups in even coding group rows while a second transcode entropy engine encodes coding groups in odd coding group rows. In this manner, utilizing N transcode engines may increase entropy encoding throughput approximately N times the throughput of a single transcode engine.

However, in some embodiments, entropy encoding different coding groups may be interdependent. For example, a coding group may be entropy encoded based at least in part on neighbor data (e.g., split flags, skip flags, and/or slice identifiers) and/or context data (e.g., table or model) determined while entropy encoding a previous coding group. As such, modifications may be made to enable multiple transcode engines to entropy encode relatively in parallel.

In some embodiments, a data (e.g., internal) buffer may be communicatively coupled between multiple transcode engines. For example, the data buffer may include a neighbor buffer that facilitates communication of neighbor data between a pair of transcode engines. Additionally, the data buffer may include a context buffer that facilitate communication of context data between a pair of transcode engines. In some embodiments, each transcode engine may store updated context data in the context buffer after processing the first two coding groups in a coding group row to facilitate implementing wavefront parallel processing (WPP).

Additionally, in some embodiments, a transcode engine may generate an output (e.g., bit) stream based at least in part on performed entropy encoding. Thus, operating multiple transcode engines may result in generating multiple output streams relatively in parallel. However, in some instances, an output (e.g., decoding) device may expected to receive encoded image data as a single stream.

Thus, in some embodiments, a combined output stream may be generated by stitching together the multiple output streams. To facilitate determining the combined bit stream, in some embodiments, each transcode engine may determine characteristic data that indicates organizational relationship of the multiple bit streams in the combined bit stream. For example, the characteristic data may include position data that indicates position (e.g., location) of header data, beginning of a slice, end of a slice, beginning of a coding group row, end of a coding group row, beginning of a group of coding groups, end of a group of coding groups, beginning of a coding group, and/or end of a coding group in an output stream. Additionally or alternatively, the characteristic data may include size data that indicates size (e.g., number of bits) of a slice, a coding group row, a group of coding groups, and/or a coding group in an output stream.

Based at least in part on characteristic data, the combined output stream may be generated. For example, the combined output stream may be generated by alternating between reading multiple output streams stored in an external storage device based at least in part on the characteristic data. In this manner, the techniques described herein may facilitate improving output rate of encoded image data by improving entropy encoding throughput while maintaining compatibility with the rest of a video encoding pipeline and/or output (e.g., decoder) devices.

BRIEF DESCRIPTION OF THE DRAWINGS

Various aspects of this disclosure may be better understood upon reading the following detailed description and upon reference to the drawings in which.

DETAILED DESCRIPTION

Figure 1:
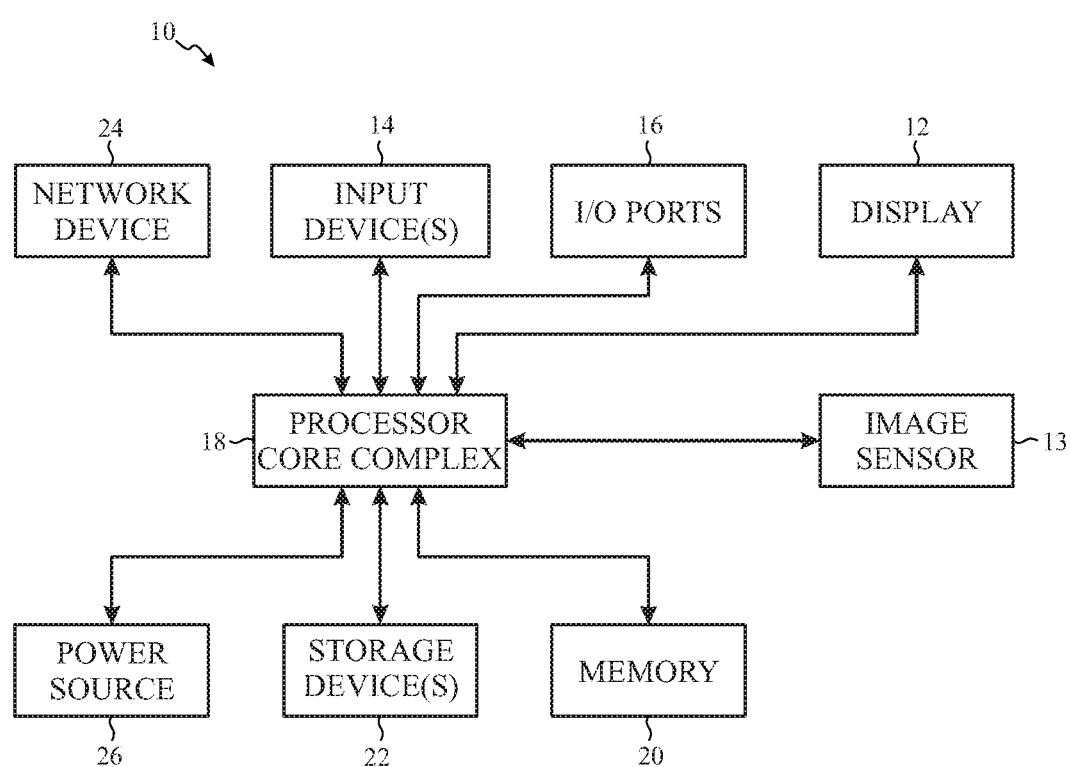
FIG. 1 is a block diagram of an electronic device used encode and/or decode image data, in accordance with an embodiment of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Generally, an electronic device may facilitate visually presenting information by instructing an electronic display to display image frames based on image data. In some instances, the image data may be generated by an image sensor (e.g., digital camera) and stored in the electronic device. Additionally, when the image data is generated external from the electronic device, the image data may be transmitted to the electronic device. As such, usage, image data may be encoded (e.g., compressed) to reduce size (e.g., number of bits), thereby improving data storage efficiency and/or data transmission efficiency.

In some instances, image data may be prediction encoded and, subsequently, entropy encoded. For example, since an image frame may change gradually, an intra-frame prediction encoding process may indicate image data of a first portion of the image frame by referencing image data of a second portion of the image frame. Additionally, since successively displayed image frames may change gradually, an inter-frame prediction encoding process may indicate image data in an image frame with reference to image data in one or more other image frames. In this manner, instead of directly compressing the image data, the prediction encoding process may generate prediction encoded image data including symbols (e.g., syntax elements) that indicate the relationship between the portions of the image data.

Additionally, an entropy encoding process may compress the prediction encoded image data based at least in part on probability of symbols occurring in the prediction encoded image data. For example, symbols that occur more frequently may be indicated using fewer bits compared to symbols that occur less frequently. In this manner, the entropy encoding process may generate entropy encoded image data, which may then be stored and/or transmitted.

In some instances, image data may be captured for real-time or near real-time display and/or transmission. As such, the ability to display and/or transmit in real-time or near real-time may be dependent at least in part on output rate of encoded image data. However, in some instances, image data throughput of the prediction encoding process and image data throughput of the entropy encoding process may vary. For example, to encode a portion of image data, the prediction encoding process may have a deterministic processing duration while the entropy encoding process may have a non-deterministic processing duration, thereby resulting in variations in instantaneous image data throughput. To help illustrate, the prediction encoding process may have a constant throughput of 1 GB/s while the encoding process may have a throughput that varies between 500 MB/s and 2 GB/s. Thus, even when average throughput is approximately equal, the entropy encoding process may present a bottleneck that limits output rate of encoded image data, which may affect ability to display and/or transmit in real-time or near real-time.

Accordingly, the present disclosure provides techniques to improve throughput of an entropy encoding process, for example, to facilitate real-time or near real-time display and/or transmission. To facilitate improved throughput, in some embodiments, the entropy encoding process may be implemented using a transcode pipeline with multiple transcode engines. For example, the transcode pipeline may include a first transcode engine and a second transcode engine that each entropy encodes coding groups. As used herein, a "coding group" is intended to describe a sample (e.g., block) of image data corresponding to a group of display pixels and, thus, may be a coding tree unit (CTU), a coding unit (CU), a macroblock, or the like.

In operation, since a single input (e.g., bin) stream is received (e.g., retrieved), the transcode pipeline may route different portions of the input stream to different transcode engines. For example, the transcode pipeline may route portions of the input stream corresponding with even rows of coding groups to the first transcode engine and portions of the input stream corresponding with odd rows of coding groups to the second transcode engine. In this manner, multiple transcode engines in the transcode pipeline may encode different coding groups relatively in parallel, thereby improving throughput of the transcode pipeline compared to a transcode pipeline using a single transcode engine.

However, entropy encoding different coding groups may be interdependent. For example, a coding group may be entropy encoded based at least in part on neighbor data (e.g., split flags, skip flags, and/or slice identifiers) determined while processing one or more neighbor coding groups. Additionally, a row of coding groups may be entropy encoded based at least in part on a context data (e.g., model or table) determined while entropy encoding a previous row of coding groups.

As such, to enable use of multiple transcode engines, modification may be made to the transcode pipeline. In some embodiments, a neighbor buffer may facilitate communication of neighbor data between transcode engines. For example, when entropy encoding a first coding group row, the first transcode engine may determine and store neighbor data determined while processing coding groups in the first coding group row in the neighbor buffer. In this manner, when entropy encoding a second coding group row directly below the first coding group row, the second transcode engine may receive (e.g., retrieve) top neighbor data from the neighbor buffer and entropy encode coding groups in the second coding group row based at least in part on the top neighbor data. Since the multiple transcode engines operate relatively in parallel, utilizing the neighbor buffer may facilitate reducing data communication with an external storage device and, thus, associated effects on latency, communication bandwidth, and/or power consumption.

Additionally, in some embodiments, a context buffer may facilitate communication of context data (e.g., model and/or table) between transcode engines. For example, after entropy encoding two coding groups in the first coding group row and updating a context table accordingly, the first transcode engine may store the updated context table in the context buffer. In this manner, the second transcode engine may receive (e.g., retrieve) the updated context table from the context buffer and initialize accordingly before entropy encoding the second coding group row. After entropy encoding two coding groups in the second coding group row and updating the context table accordingly, the second transcode engine may store the updated context table in the context buffer, thereby enabling the first transcode engine to initialize accordingly before entropy encoding a third coding group row. In this manner, the context buffer may facilitate improving encoding efficiency by enabling transcode engines to initialize based on previously processed coding units and/or providing wavefront parallel processing (WPP).

In some embodiments, each of the transcode engines may store an output (e.g., bit) stream in a different portion of the external storage device. For example, the first transcode engine may store a first output stream generated by entropy encoding the even coding group rows in a first portion of the external storage device. On the other hand, the second transcode engine may store a second output stream generated by entropy encoding the odd coding group rows in a second portion of the external storage device. However, encoded image data is generally processed (e.g., decoded) as a single output stream.

As such, modifications may be made to the transcode pipeline to facilitate determining a combined output stream that combines the output streams generated by multiple transcode engines. In some embodiments, each transcode engine may determine characteristics of its generated output stream, such a position (e.g., location) of headers in the output stream and/or size (e.g., number of bits) of one or more coding groups in the output stream. For example, when a transcode engine detects a slice header in an input stream, the transcode engine may store position data that indicates position of the slice header in a position queue. Additionally, when a transcode engine reaches the end of a coding group row, the transcode engine may store size data that indicates size of the coding group row in a size queue.

To generate the combined output stream, in some embodiments, the output streams generated by multiple transcode engines may be stitched together based at least in part on the determined characteristics. For example, the combined output stream may be generated by reading a first output stream from the external storage device until a first coding group row size is reached, reading a second output stream from the external storage device until a second coding group row size is reach, reading the first output stream from the external storage device until a third coding group row size is reached, reading the second output stream from the external storage device until a fourth coding group row size is reach, and so on. Additionally, the combined output stream corresponding with a slice may be generated by switching between reading the first output stream starting a slice header position until a slice size is reached. In this manner, the techniques described herein may facilitate improving output rate of encoded image data by improving throughput of a transcode pipeline while maintaining compatibility with the rest of a video encoding pipeline and/or output (e.g., decoder) devices.

To help illustrate, an electronic device 10 that may utilize an electronic display 12 to display image frames based on image data and/or utilize an image sensor 13 to capture image data is shown in FIG. 1. As will be described in more detail below, the electronic device 10 may be any suitable electronic device, such as a computer, a mobile phone, a portable media device, a tablet, a television, a virtual-reality headset, a vehicle dashboard, and the like. Thus, it should be noted that FIG. 1 is merely one example of a particular implementation and is intended to illustrate the types of components that may be present in an electronic device 10.

In the depicted embodiment, the electronic device 10 includes the electronic display 12, the image sensor 13, one or more input devices 14, one or more input/output (I/O) ports 16, a processor core complex 18 having one or more processor(s) or processor cores, local memory 20, a main memory storage device 22, a network interface 24, and a power source 26. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the local memory 20 and the main memory storage device 22 may be included in a single component.

As depicted, the processor core complex 18 is operably coupled with local memory 20 and the main memory storage device 22. Thus, the processor core complex 18 may execute instruction stored in local memory 20 and/or the main memory storage device 22 to perform operations, such as encoding image data captured by the image sensor 13 and/or decoding image data for display on the electronic display 12. As such, the processor core complex 18 may include one or more general purpose microprocessors, one or more application specific processors (ASICs), one or more field programmable logic arrays (FPGAs), or any combination thereof.

In addition to instructions, the local memory 20 and/or the main memory storage device 22 may store data to be processed by the processor core complex 18. Thus, in some embodiments, the local memory 20 and/or the main memory storage device 22 may include one or more tangible, non-transitory, computer-readable mediums. For example, the local memory 20 may include random access memory (RAM) and the main memory storage device 22 may include read only memory (ROM), rewritable non-volatile memory such as flash memory, hard drives, optical discs, and/or the like.

As depicted, the processor core complex 18 is also operably coupled with the network interface 24. In some embodiments, the network interface 24 may facilitate communicating data with another electronic device and/or a network. For example, the network interface 24 (e.g., a radio frequency system) may enable the electronic device 10 to communicatively couple to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit encoded image data to a network and/or receive encoded image data from the network for display on the electronic display 12.

Additionally, as depicted, the processor core complex 18 is operably coupled to the power source 26. In some embodiments, the power source 26 may provide electrical power to one or more component in the electronic device 10, such as the processor core complex 18 and/or the electronic display 12. Thus, the power source 26 may include any suitable source of energy, such as a rechargeable lithium polymer (Li-poly) battery and/or an alternating current (AC) power converter.

Furthermore, as depicted, the processor core complex 18 is operably coupled with the one or more I/O ports 16. In some embodiments, an I/O ports 16 may enable the electronic device 10 to interface with other electronic devices. For example, when a portable storage device is connected, the I/O port 16 may enable the processor core complex 18 to communicate data with the portable storage device. In this manner, the I/O ports 16 may enable the electronic device 10 to output encoded image data to the portable storage device and/or receive encoded image data from the portable storage device.

As depicted, the electronic device 10 is also operably coupled with the one or more input devices 14. In some embodiments, an input device 14 may facilitate user interaction with the electronic device 10, for example, by receiving user inputs. Thus, an input device 14 may include a button, a keyboard, a mouse, a trackpad, and/or the like. Additionally, in some embodiments, an input device 14 may include touch-sensing components in the electronic display 12. In such embodiments, the touch sensing components may receive user inputs by detecting occurrence and/or position of an object touching the surface of the electronic display 12.

In addition to enabling user inputs, the electronic display 12 may include a display panel with one or more display pixels. As described above, the electronic display 12 may control light emission from the display pixels to present visual representations of information, such as a graphical user interface (GUI) of an operating system, an application interface, a still image, or video content, by displaying image frames based at least in part on corresponding image data. In some embodiments, the image data may be received from other electronic devices 10, for example, via the network interface 24 and/or the I/O ports 16. Additionally or alternatively, the image data may be generated by electronic device 10, for example, based on visual representations of proximate physical features captured by the image sensor 13.

To facilitate improving data storage and/or data communication efficiency, the image data may be encoded (e.g., compressed), for example, by the electronic device 10 that generated the image data. Once generated or received, the encoded image data may be stored in local memory 20. Accordingly, to display a corresponding image frame, the processor core complex 18 may retrieve encoded image data from local memory 20, decode the encoded image data, and instruct the electronic display 12 to display the image frame based on the decoded image data.

Figure 2:
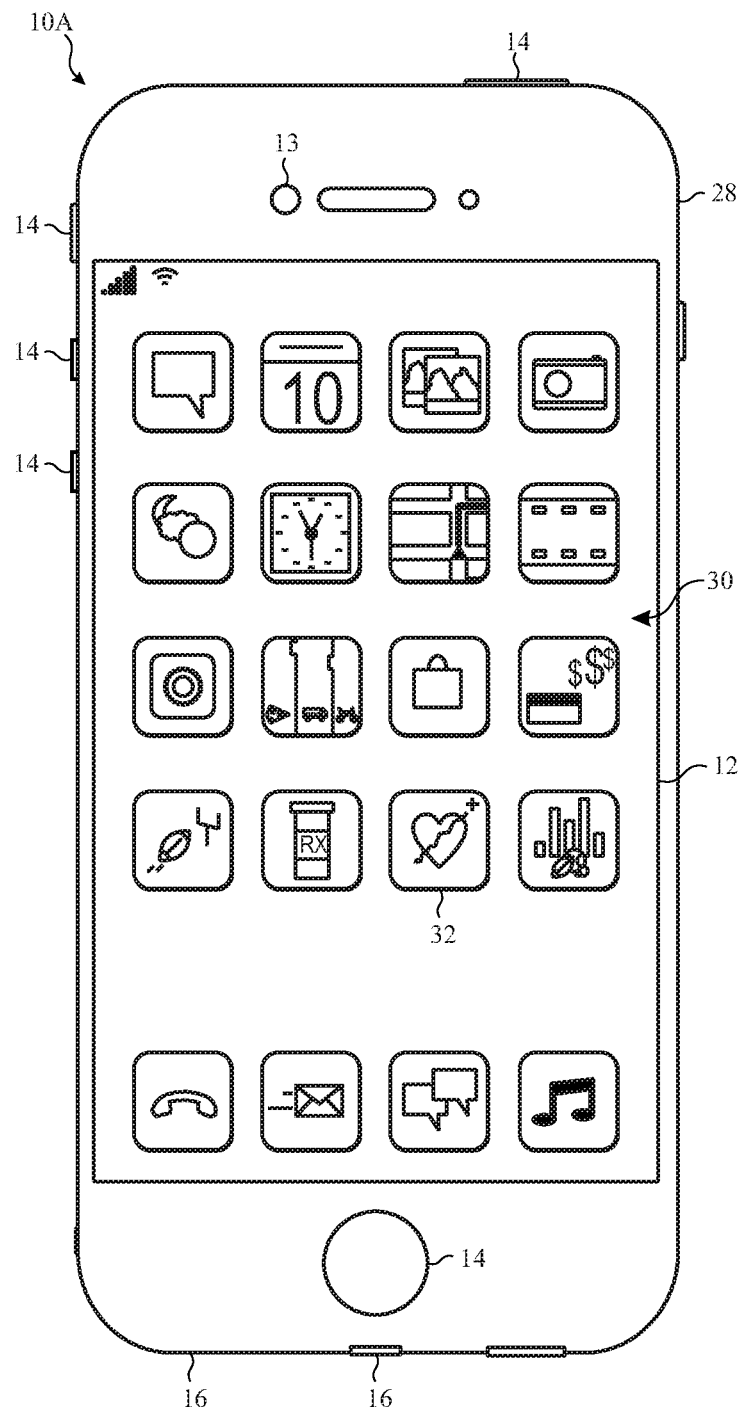
FIG. 2 is one example of the electronic device of FIG. 1, in accordance with an embodiment of the present disclosure.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon 32 is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
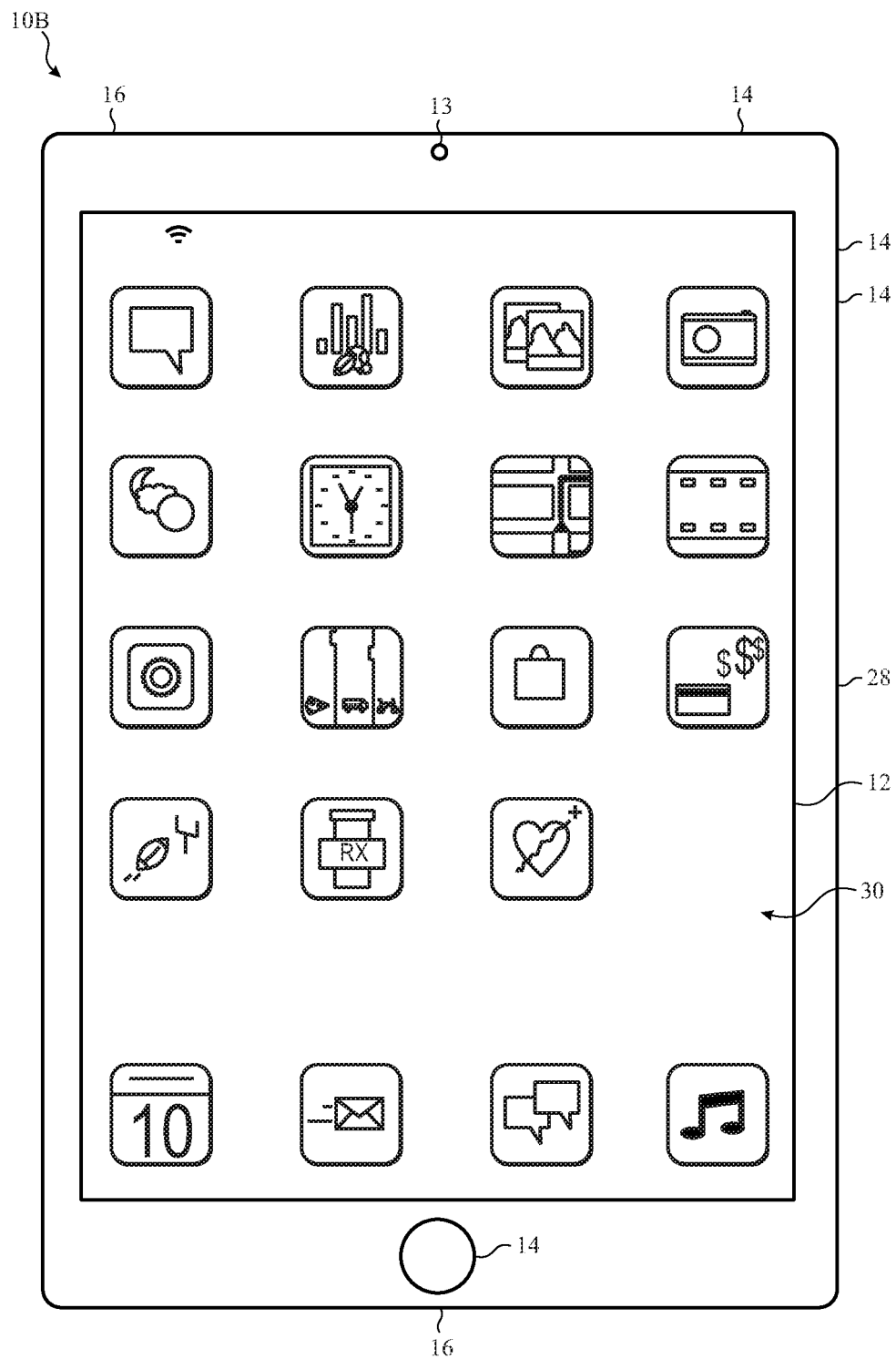
FIG. 3 is another example of the electronic device of FIG. 1, in accordance with an embodiment of the present disclosure.
Figure 4:
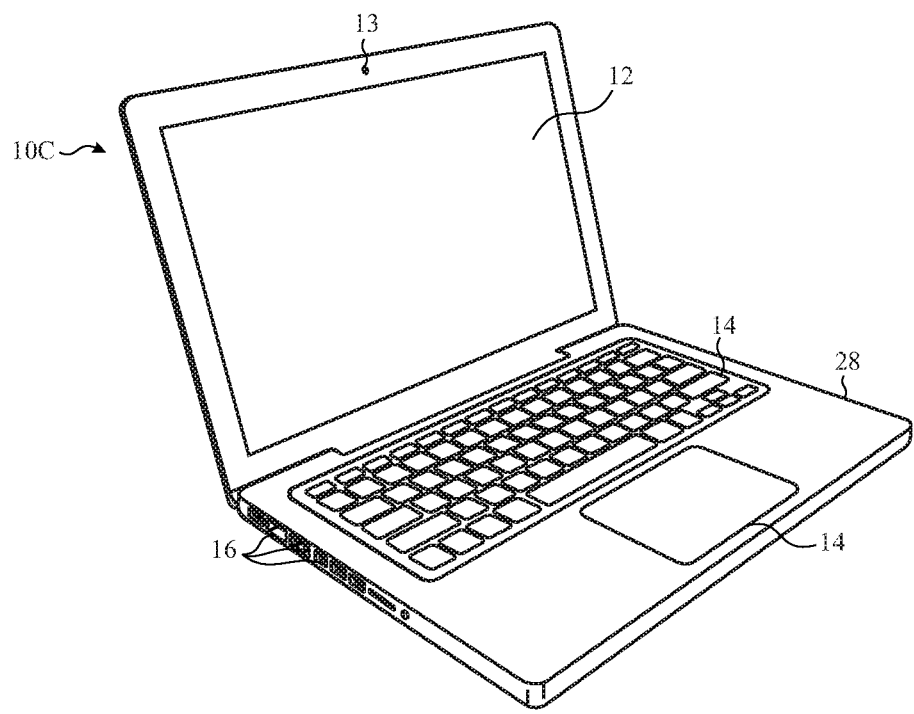
FIG. 4 is another example of the electronic device of FIG. 1, in accordance with an embodiment of the present disclosure.
Figure 5:
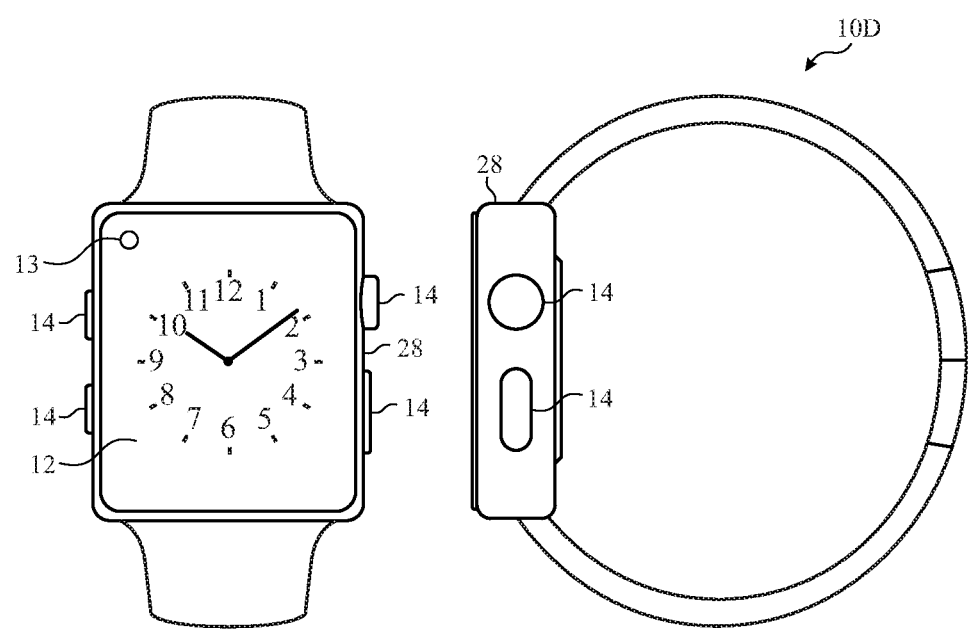
FIG. 5 is another example of the electronic device of FIG. 1, in accordance with an embodiment of the present disclosure.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, image data may be encoded (e.g., compressed) to facilitate reducing resource (e.g., storage and/or communication) usage. Additionally, to facilitate real-time or near real-time display and/or transmission, duration between generation of image data and display of image frames based on the image data may be limited. For example, image data captured by the image sensor 13 may be displayed on the electronic display 12 with minimal delay to enable a user to determine physical features proximate the image sensor 13 in real-time or near real-time. Additionally, image data generated by the electronic device 10 may be transmitted (e.g., broadcast) to one or more other electronic devices 10 to enable a real-time or near real-time streaming. As such, duration available to encode image data may be limited—particularly as resolution of image frames increases and/or refresh rate of electronic displays 12 increases.

Figure 6:
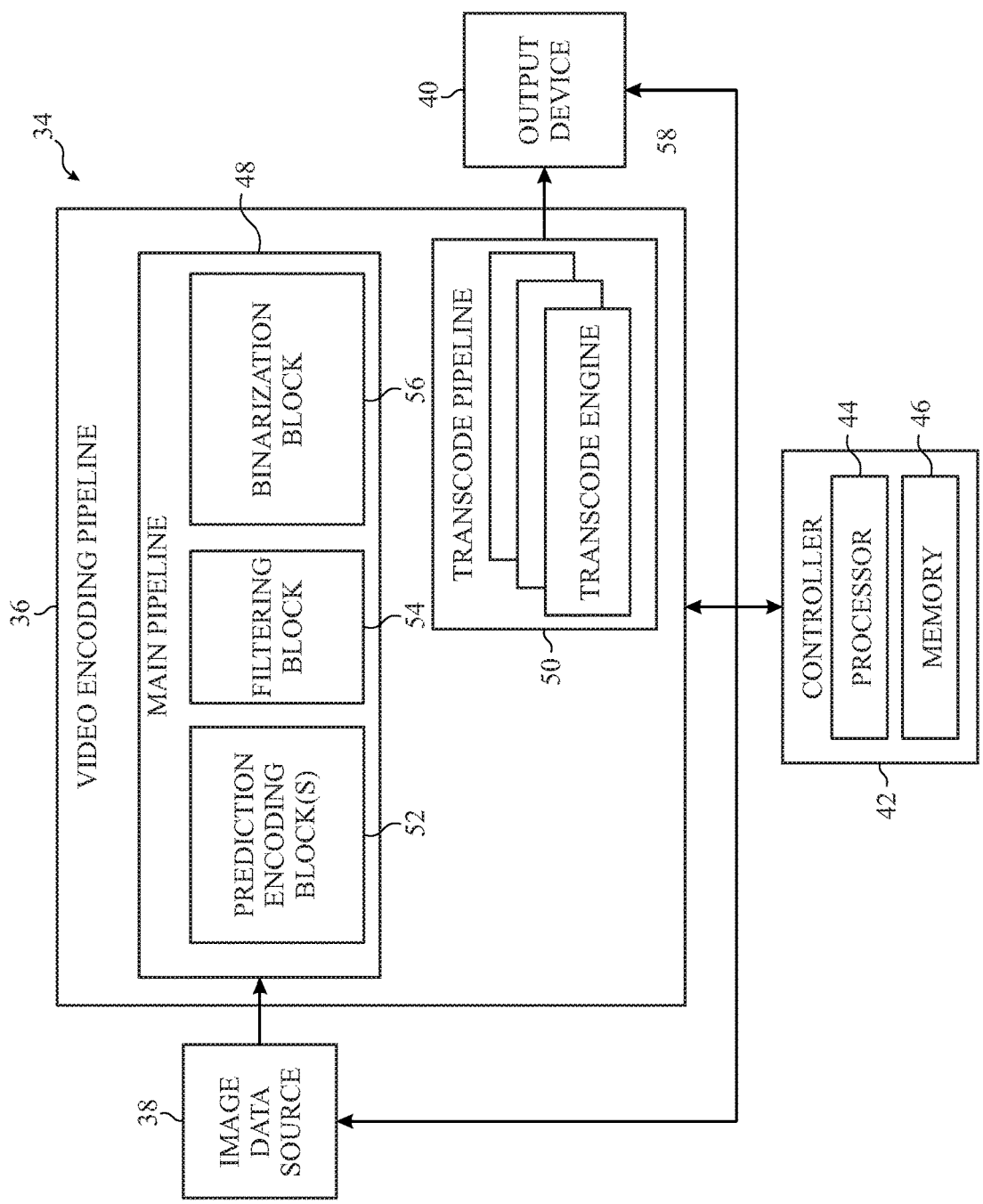
FIG. 6 is block diagram of a video encoding pipeline including a transcode pipeline used to encode image data, in accordance with an embodiment of the present disclosure.

To help illustrate, one embodiment of a portion 34 of an electronic device 10 including a video encoding pipeline 36 that may be used to encode image data is shown in FIG. 6. In some embodiments, at least a portion of the video encoding pipeline 36 may be implemented by executing instructions stored in a tangible, non-transitory, computer-readable medium using the processor core complex 18 and/or one or more other processing units. Additionally, in some embodiments, at least a portion of the video encoding pipeline 36 may be implemented based on circuit connections formed in processing circuitry.

As depicted, the portion 34 of the electronic device 10 also includes an image data source 38, an output device 40, and a controller 42. In some embodiments, the controller 42 may control operation of the video encoding pipeline 36, the image data source 38, and/or the output device 40. To facilitate controlling operation, the controller 42 may include a controller processor 44 and controller memory 46. In some embodiments, the controller processor 44 may execute instructions stored in the controller memory 46. Thus, in some embodiments, the controller processor 44 may be included in the processor core complex 18 and/or one or more other processing units. Additionally, in some embodiments, the controller memory 46 may be included in the local memory 20, the main memory storage device 22, a separate tangible, non-transitory, computer readable medium, or any combination thereof.

In the depicted embodiment, the video encoding pipeline 36 is communicatively coupled to the image data source 38. In this manner, the video encoding pipeline 36 may receive source image data from the image data source 38. Thus, in some embodiments, the image data source 38 may be the image sensor 13 and/or any other suitable device that generates source image data.

Additionally, in the depicted embodiment, the video encoding pipeline 36 is communicatively coupled to the output device 40. In this manner, the video encoding pipeline 36 may output encoded (e.g., compressed) image data to the output device 40, for example, for storage and/or transmission. Thus, in some embodiments, the output device 40 may include the local memory 20, the main memory storage device 22, the network interface 24, the I/O ports 16, the controller memory 46, or any combination thereof.

To facilitate generating encoded image data, the video encoding pipeline 36 may be implemented using multiple parallel pipelines. For example, in the depicted embodiment, the video encoding pipeline 36 includes a main pipeline 48 and a transcode pipeline 50. In particular, the main pipeline 48 may facilitate encoding source image data by performing various image data processing functions. To simplify discussion, the functions are divided between various blocks (e.g., circuitry or modules) in the main pipeline 48—namely one or more prediction encoding blocks 52, a filtering block 54, and a binarization block 56.

In particular, the prediction encoding blocks 52 may prediction encode source image data to generate prediction encoded image data. Thus, in some embodiments, the prediction encoding blocks 52 may include a motion estimation block, an inter-frame prediction block, an intra-frame prediction block, a mode decision block, a chroma reconstruction block, and/or a luma reconstruction block. Additionally, in some embodiments, the prediction encoding block 52 may successively prediction encode coding groups of source image data received from the image data source 38.

To prediction encode a coding group, the prediction encoding blocks 52 may determine prediction encoding parameters that indicate the coding group with reference to other image data. In some embodiments, the prediction encoding parameters may include a prediction mode (e.g., inter-frame prediction mode or intra-frame prediction mode), a quantization coefficient, configuration of prediction groups (e.g., units) in a coding group, configuration of transform groups (e.g., units) in a coding group, and/or prediction residuals. For example, the prediction encoding blocks 52 may determine an intra-frame prediction mode that indicates the coding group with reference to image data in the same image frame or an inter-frame prediction mode that indicate the coding group with reference to image data in a different image frame.

In any case, the prediction encoding blocks 52 may apply the prediction mode to determine a predicted coding group, for example, based at least in part on the configuration of the prediction groups. Additionally, the prediction encoding blocks 52 may determine the prediction residual based at least in part on differences between the predicted coding group and the source coding group. Furthermore, the prediction encoding blocks 52 may determine reconstructed image data, which provides an indication of decoded image data expected to be determined by a decoding device and, thus, may be used to facilitate prediction encoding subsequent coding groups. In some embodiments, the prediction encoding blocks 52 may facilitate determining the reconstructed image data by applying a forward transform, a forward quantization, an inverse quantization, and an inverse transform to the prediction residual based at least in part on the configuration of the transform groups and/or the quantization coefficients.

To facilitate improving quality of decoded image data, the filtering block 54 may determine filtering parameters that may be applied by a decoding device. In some embodiments, the filtering parameters may include deblock filtering parameters and/or sample adaptive offset (SAO) parameters. For example, the filtering block 54 may process the reconstructed image data to determine deblock filtering parameters, which when applied to decoded image data is expected to reduce likelihood of perceivable blocking visual artifacts. Additionally or alternatively, the filtering block 54 may process the reconstructed image data and/or deblocked image data to determine sample adaptive offset parameters, which when applied to decoded image data is expected to reduce likelihood of perceivable banding and/or ringing (e.g., edge) visual artifacts.

Thus, to facilitate decoding encoded image data, the prediction encoding parameters and/or the filtering parameters may be communicated to a decoding device, for example, via a storage device and/or a communication network. In some embodiments, the prediction encoding parameters and/or filtering parameters may be indicated using symbols (e.g., syntax elements). For example, a first syntax element may indicate a prediction mode (e.g., inter-frame prediction mode or intra-frame prediction mode), a second syntax element may indicate a quantization coefficient, a third syntax element may indicate configuration of prediction units, and a fourth syntax element may indicate configuration of transform units.

As described above, data storage efficiency and/or data communication efficiency may be further improved by entropy encoding the symbols. To facilitate entropy encoding, in some embodiments, the binarization block 56 may binarize the symbols. For example, the binarization block 56 binarize a symbol by mapping the symbol to a corresponding binary representation, which includes one or more bins (e.g., "0" or "1"). In some embodiments, the binarization block 56 may generate the binary representation using exp-golomb coding, fixed length coding, truncated unary coding, and/or truncated rice coding. In this manner, the binarization block 56 may generate a bin stream, which may be entropy encoded by the transcode pipeline 50.

In some embodiments, processing duration of a coding group by the main pipeline 48 may be relatively deterministic while processing duration of the coding group by the transcode pipeline 50 may be relatively non-deterministic. In other words, although average throughput may be approximately equal, instantaneous throughput of the transcode pipeline 50 may vary from the main pipeline 48. For example, throughput of the main pipeline 48 may be a relatively constant 1 GB/s while throughput of the transcode pipeline 50 varies between 500 MB/s and 2 GB/s.

To reduce likelihood of back pressuring the main pipeline 48, in some embodiments, the transcode pipeline 50 may be de-coupled from the main pipeline 48. For example, the binarization block 56 may store the bin stream in an external storage device, such as the controller memory 46, via write direct memory access (DMA). Subsequently, the transcode pipeline 50 may retrieve the bin stream from the external storage device, for example, via read directly memory access. In this manner, the transcode pipeline 50 may determine and entropy encode the bin stream to determine a bit stream supplied to an output device 40, such as the external storage device, a decoding device, and/or a communication network.

In some embodiments, increasing throughput of the transcode pipeline 50 may further reduce likelihood of back pressuring the main pipeline 48 and/or improve overall throughput of the video encoding pipeline 36, which may facilitate real-time or near real-time display and/or transmission. To facilitate improving throughput, in some embodiments, the transcode pipeline 50 may utilize multiple transcode engines 58 that each entropy encode different portions of the bin stream relatively in parallel. For example, the transcode pipeline 50 may include two transcode engines 58 to approximately double throughput, three transcode engines 58 to approximately triple throughput, or N transcode engines 58 to increase throughput approximately N times the throughput of a single transcode engine 58.

Although facilitating improved throughput, operating multiple transcode engines 58 relatively in parallel may also increase power consumption, for example, due to storing data in and/or retrieving data from an external storage device via direct memory access. Thus, in some embodiments, the transcode pipeline 50 may dynamically adjust number of transcode engines 58 operating on the bin stream. For example, the transcode pipeline 50 may power gate transcode engines 58 based at least in part on target (e.g., desired) throughput of the transcode pipeline 50 and/or the video encoding pipeline 36 as a whole. In this manner, the transcode pipeline 50 may facilitate reducing power consumption while achieving a target throughput (e.g., output rate of encoded image data).

Moreover, operating multiple transcode engines 58 relatively in parallel may increase operational complexity, for example, due to encoding dependency between different (e.g., neighboring) coding groups. For example, a coding group may be entropy encoded based at least in part on processing of a top neighbor coding group and/or a left neighbor coding group. As such, to facilitate operating multiple transcode engines 58 relatively in parallel, modifications may be made to the transcode pipeline 50.

Figure 7:
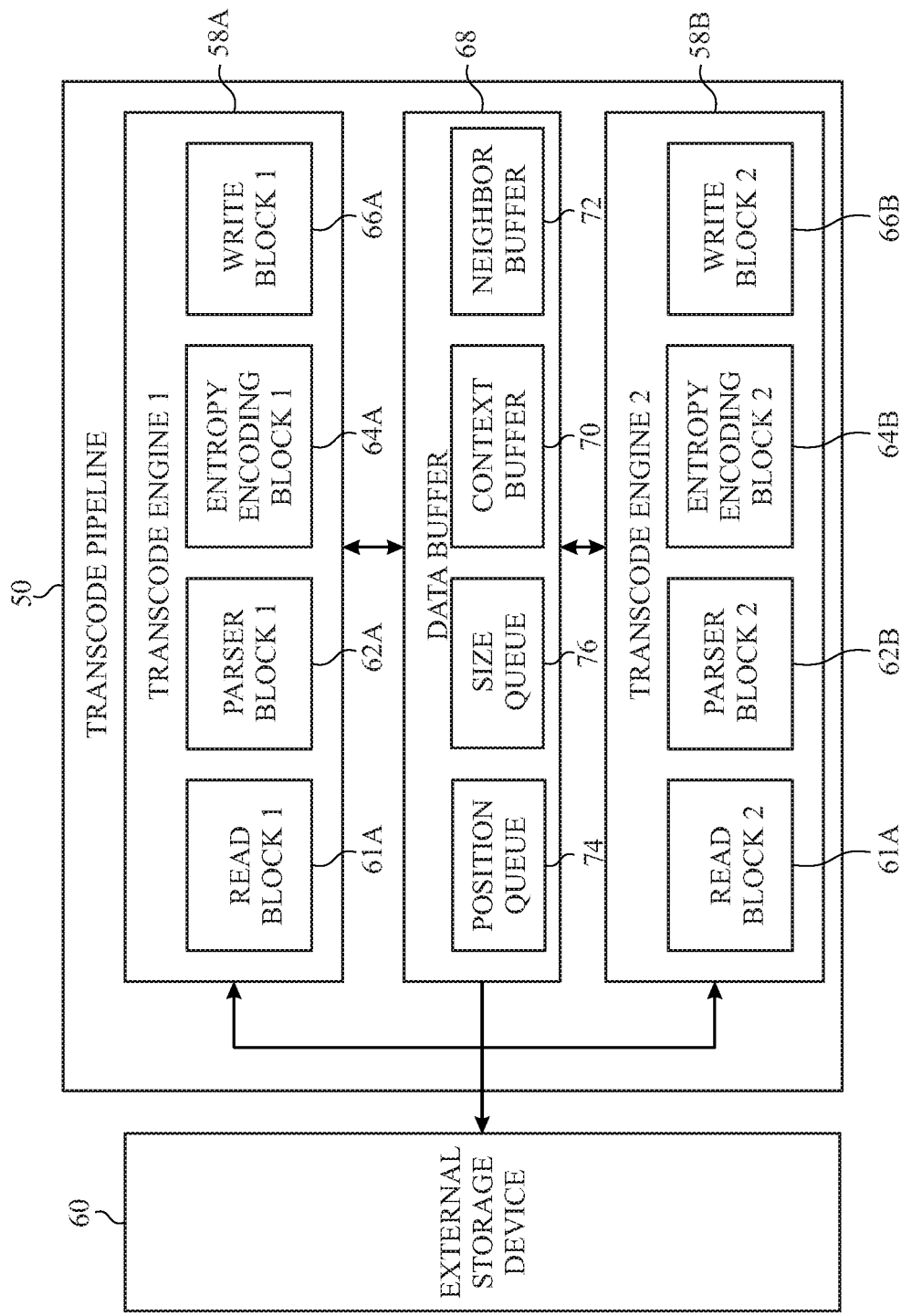
FIG. 7 is block diagram of an example of the transcode pipeline of FIG. 6, in accordance with an embodiment of the present disclosure.

To help illustrate, one embodiment of a transcode pipeline 50 including multiple transcode engines 58—namely a first transcode engine 58A and a second transcode engine 58B—is shown in FIG. 7. Additionally, in the depicted embodiment, the transcode pipeline 50 is communicatively coupled to an external storage device 60. In some embodiments, the external storage device 60 may be dynamic random-access memory (DRAM) in the controller memory 46, the local memory 20, the main memory storage device 22, and/or a separate tangible, non-transitory, computer readable medium.

As described above, in some embodiments, the external storage device 60 may facilitate communicating a bin stream generated by the binarization block 56 from the main pipeline 48 to the transcode pipeline 50. In particular, the main pipeline 48 may write (e.g., store) the generated bin stream to the external storage device 60, for example, via write direct memory access. Additionally, the transcode pipeline 50 may read (e.g., retrieve) the bin stream from the external storage device 60, for example, via read direct memory access.

To facilitate determining the bin stream, in some embodiments, each transcode engine 58 in a transcode pipeline 50 may include a read block 61. For example, in the depicted embodiment, the first transcode engine 58A includes a first read block 61A and the second transcode engine 58B includes a second read block 61B. In this manner, each transcode engine 58 may relatively independently read different portions of the bin stream, which may facilitate entropy encoding the different portions relatively in parallel. For example, in some embodiments, the first read block 61A may retrieve portions of the bin stream corresponding to even numbered coding group rows and the second read block 61B may retrieve portions of the bin stream corresponding to odd numbered coding group rows.

To facilitate entropy encoding, in some embodiments, each transcode engine 58 in a transcode pipeline 50 may include a parser block 62 and an entropy encoding block 64. For example, in the depicted embodiment, the first transcode engine 58A includes a first parser block 62A and a first entropy encoding block 64A. Similarly, the second transcode engine 58B includes a second parser block 62B and a second entropy encoding block 64B.

In particular, a parser block 62 may parse bins read into a transcode engine 58, for example, to identify one or more bins corresponding with each symbol. Subsequently, the entropy encoding block 64 may entropy encode the bins to determine encoded bits and, thus, a bit stream. For example, with regard to the depicted embodiment, the first entropy encoding block 64A may entropy encode bins corresponding with even numbered coding group rows while the second entropy encoding block 64B may entropy encode regular bins corresponding with even numbered coding group rows.

In some embodiments, an entropy encoding block 64 may compress bins into bits using arithmetic coding. To facilitate arithmetic coding, an entropy encoding block 64 determine a context data (e.g., model or table), which indicates probability of the bin being a "1" or "0" based on previous bins. Additionally, based on the probability, an entropy encoding block 64 may divide a range into two sub-ranges and determine an encoded bit such that it falls within one of two sub-ranges to select the actual value of the bin. In this manner, multiple bins may be represented by a single bit, thereby improving encoding efficiency (e.g., reduction in size of source image data).

Thus, as described above, entropy encoding bins corresponding to a coding group may be dependent on entropy encoding of bins corresponding to other coding groups. For example, since neighboring coding groups may be relatively similar, the bins used to indicate neighboring coding groups may be relatively similar. As such, in some embodiments, context data may be updated after entropy encoding each coding group. In this manner, a coding group may be entropy encoded based at least in part on processing of neighboring (e.g., top and/or left) coding groups to facilitate improving encoding efficiency. For example, context data used to entropy encode a coding group row may be initialized based on a context model used to entropy a previous (e.g., above) coding group row. Additionally, the context data may be updated based on neighbor data determined by entropy encoding a left neighbor coding block and/or a top neighbor coding block.

However, when using multiple transcode engines 58, neighboring coding groups may be entropy encoded by different transcode engines 58. For example, with regard to the depicted embodiment, the second transcode engine 58B may entropy encode a coding group and a left neighbor coding group while the first transcode engine 58A entropy encodes a top neighbor coding group. Additionally, the first transcode engine 58A may entropy encode a coding group and a left neighbor coding group while the second transcode engine 58B entropy encodes a top neighbor coding group.

In other words, to facilitate entropy encoding a bin stream using multiple transcode engines 58, data communication may be provided between the transcode engines 58. In some embodiments, data communication may be provided using the external storage device 60 via direct memory access. Thus, in some embodiments, each transcode engine 58 in a transcode pipeline 50 may include a write block 66A. For example, with regard to the depicted embodiment, the first transcode engine 58A includes a first write block 66A and the second transcode engine 58B includes a second write block 66B.

In this manner, a write block 66 may write (e.g., store) updated context models and/or neighbor data to the external storage device 60, for example, via write direct memory access. Additionally, a read block 61 may read (e.g., retrieve or receive) the updated context models and/or neighbor data from the external storage device 60, for example, via read direct memory access. However, in some instances, writing to and/or reading from the external storage device 60 may increase latency, power consumption, and/or implemented communication bandwidth.

Thus, the transcode pipeline 50 may additionally or alternatively include a data buffer 68 to facilitate data communication between multiple transcode engines 58. In the depicted embodiment, the data buffer 68 includes a context buffer 70, a neighbor buffer 72, a position queue 74, and a size queue 76. In some embodiments, the context buffer 70 may facilitate communication of updated context data between multiple transcode engines 58. For example, the first transcode engine 58A may update and store context data in the context buffer 70 after entropy encoding two coding groups in a first coding group row. In this manner, the second transcode engine 58B may retrieve the updated context model from the context buffer 70 before entropy encoding a second coding group row.

In some embodiments, context data may be updated based at least in part on neighbor data determined while processing a coding group. Thus, in some embodiments, the neighbor data may include one or more split flags that indicate whether a coding group is sub-divided into one or more smaller coding groups and/or size of the one or more smaller coding groups. For example, four 2-bit split flags be used to indicate number and/or size of coding units (CUs) in a coding tree unit (CTU). Additionally, in some embodiments, the neighbor data may include one or more skip flags that indicate whether prediction encoding is skipped for one or more portion of a coding group. For example, four 1-bit skip flags may be used to indicate whether prediction encoding is skipped for one or more coding units in a coding tree unit. Furthermore, in some embodiments, the neighbor data may include a slice identifier that indicates slice in which a coding group is included.

Based at least in part on neighbor data, context data to be used to entropy encode a subsequent coding group may be determined. For example, bins encountered when processing the split flags and/or the skip flags may be used to adjust bin probabilities in the context data. Additionally, in some embodiments, the slice identifier may facilitate determining whether neighbor coding groups are in the same slice and, thus, whether neighbor data corresponding with a neighbor coding group should be used to update context data.

Thus, in some embodiments, the neighbor buffer 72 may facilitate communication of neighbor data between multiple transcode engines 58. For example, the first transcode engine 58A may determine neighbor data based on processing coding groups in the first coding group row and store the neighbor data in the neighbor buffer 72. In this manner, the second transcode engine 58B may retrieve neighbor data corresponding with a top neighbor coding group from the neighbor buffer 72 before processing each coding group in the second coding group row.

Based at least in part on the context data and/or the neighbor data, an entropy encoding block 64 may determine encoded bits. As described above, in some embodiments, the external storage device 60 may function as the output device 40. Thus, in such embodiments, a write block 66 may write the encoded bits as a bit stream to the external storage device 60, for example, via write direct memory access.

When utilizing multiple transcode engines 58, this may result in multiple bit streams being generated and stored in the external storage device 60. For example, the first transcode engine 58A may generate and store a first bit stream corresponding to coding groups in even numbered coding group rows. On the other hand, the second transcode engine 58B may generate a store a second bit stream corresponding to coding groups in odd numbered coding group rows.

In some embodiments, since multiple transcode engines 58 may operate relatively in parallel, each transcode engine 58 may store its generated bit stream in a different portion of the external storage device 60. For example, the first transcode engine 58A may store the first bit stream in a first portion of the external storage device 60 while the second transcode engines 58B stores the second bit stream in a second portion of the external storage device 60. However, encoded image data is generally processed (e.g., decoded) as a single bit stream.

As such, in some embodiments, each transcode engines 58 may determine characteristics of its generated bit stream to facilitate stitching multiple bit streams into a combined (e.g., single) bit stream. In some embodiments, the characteristics may include position data that, for example, indicates position (e.g., location) of header data, beginning of a slice, end of a slice, beginning of a coding group row, end of a coding group row, beginning of a group of coding groups, end of a group of coding groups, beginning of a coding group, and/or end of a coding group in a bit stream. Additionally, in some embodiments, the characteristics may include size data that, for example, indicates size (e.g., number of bits) of a slice, a coding group row, a group of coding groups, and/or a coding group in a bit stream.

In some embodiments, a transcode engine 58 may store position data in the position queue 74 and size data in the size queue 76. Additionally, in some embodiments, the position queue 74 may include multiple queues that each stores position data related to one slice, one coding group row, one group of coding groups, and/or one coding group. Furthermore, in some embodiments, the size queue 76 may include multiple queues that each stores size data related to one slice, one coding group row, one group of coding groups, and/or one coding group. Based at least in part on the position data and/or the size data, a combined bit stream may be read from the external storage device 60, for example, to a decoding device. In this manner, the techniques described in the present disclosure may facilitate improving throughput of a transcode pipeline 50 while maintaining compatibility with the main pipeline 48 and/or output (e.g., decoding) devices 40.

Figure 8:
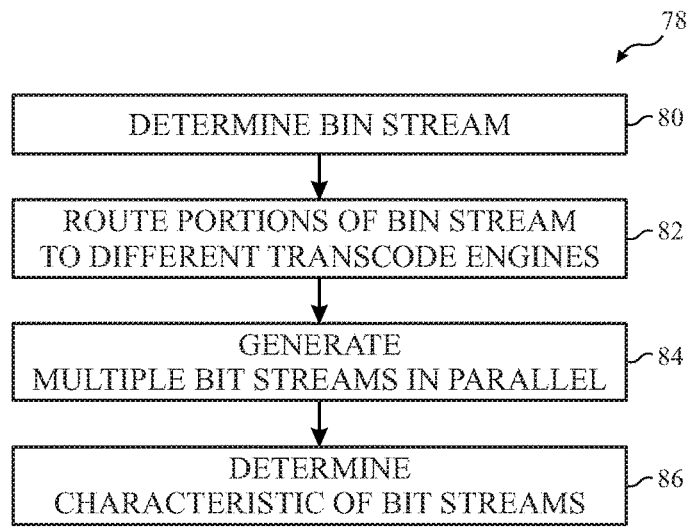
FIG. 8 is a flow diagram of a process for operating the transcode pipeline of FIG. 6, in accordance with an embodiment of the present disclosure.

To help illustrate, one embodiment of a process 78 for operating a transcode pipeline 50 is described in FIG. 8. Generally, the process 78 includes determining a bin stream (process block 80), routing portions of the bin stream to different transcode engines (process block 82), generating multiple bit streams in parallel (process block 84), and determining characteristics of the multiple bit streams (process block 86). In some embodiments, the process 78 may be implemented based on circuit connections formed in the video encoding pipeline 36 and/or the transcode pipeline 50. Additionally or alternatively, in some embodiments, the process 78 may be implemented by executing instructions stored in a tangible, non-transitory, computer-readable medium, such as the controller memory 46, using a processor, such as the controller processor 44.

Accordingly, in some embodiments, the controller 42 may instruct the video encoding pipeline 36 to determine a bin stream (process block 80). As described above, in some embodiments, the main pipeline 48 may generate and store the bin stream in the external storage device 60. Thus, in such embodiments, the transcode pipeline 50 may use one or more read blocks 61 to retrieve (e.g., read) the bin stream from the external storage device 60, for example, via read direct memory access.

To facilitate processing relatively in parallel, the controller 42 may instruct the transcode pipeline 50 to route different portions of the bin stream to different transcode engines 58 (process block 82). In some embodiments, the bin stream may be routed by instructing read blocks 61 in different transcode engines 58 to retrieve different portions of the bin stream. Additionally, in some embodiments, the bin stream may be routed based at least in part on number of transcode engines 58 and/or location of a corresponding coding group in an image frame.

Figure 9:
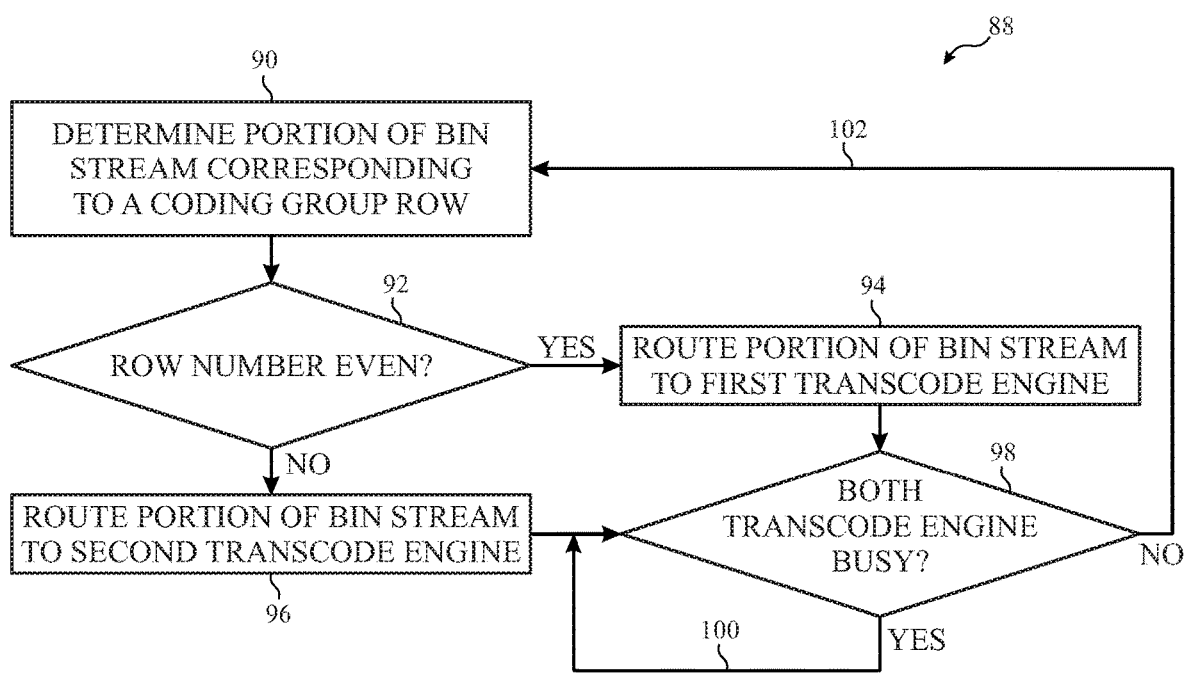
FIG. 9 is a flow diagram of a process for routing bin streams to multiple transcode engines in the transcode pipeline of FIG. 7, in accordance with an embodiment of the present disclosure.

To help illustrate, one embodiment of a process 88 for routing a bin stream between the first transcode engine 58A and the second transcode engines 58B is described in FIG. 9. Generally, the process 88 includes determining a portion of a bin stream corresponding to a coding group row (process block 90), determining whether row number of the coding group row is even (decision block 92), routing the portion of the bin stream to the first transcode engine when the row number is even (process block 94), and routing the portion of the bin stream to the second transcode engine when the row number is not even (process block 96). Additionally, the process 88 includes determining whether both transcode engines are busy (decision block 98), waiting when both transcode engines are busy (arrow 100), and determining a portion of the bin stream corresponding to a next coding group row when both transcode engines are not busy (arrow 102). In some embodiments, the process 88 may be implemented based on circuit connections formed in the video encoding pipeline 36 and/or the transcode pipeline 50. Additionally or alternatively, in some embodiments, the process 88 may be implemented by executing instructions stored in a tangible, non-transitory, computer-readable medium, such as the controller memory 46, using a processor, such as the controller processor 44.

Accordingly, in some embodiments, the controller 42 may determine a portion of a bin stream corresponding to a coding group row (process block 90) and whether the row number of the coding group row is even (decision block 92). In some embodiments, the controller 42 determine location of a coding group row in an image frame, for example, by analyzing the source image data or based at least in part on an indication from the image data source 38 and/or the main pipeline 48. Based at least in part on the location, the controller 42 may determine whether the coding group row is an even numbered row (e.g., row 0, row 2, row 4, etc.) or an odd numbered row (e.g., row 1, row 3, row 5, etc.).

When the coding group row is an even numbered row, the controller 42 may instruct the transcode pipeline 50 to route the corresponding bins to the first transcode engine 58A (process block 94). In some embodiments, bins may be routed to the first transcode engine 58A by instructing the first read block 61A to read the portion of the bin stream from the external storage device 60. On the other hand, when the coding group is not an odd numbered row, the controller 42 may instruct the transcode pipeline 50 to route the corresponding bins to the second transcode engine 58B (process block 96). In some embodiments, bins may be routed to the second transcode engine 58B by instructing the second read block 61B to read the portion of the bin stream from the external storage device 60.

Figure 10:
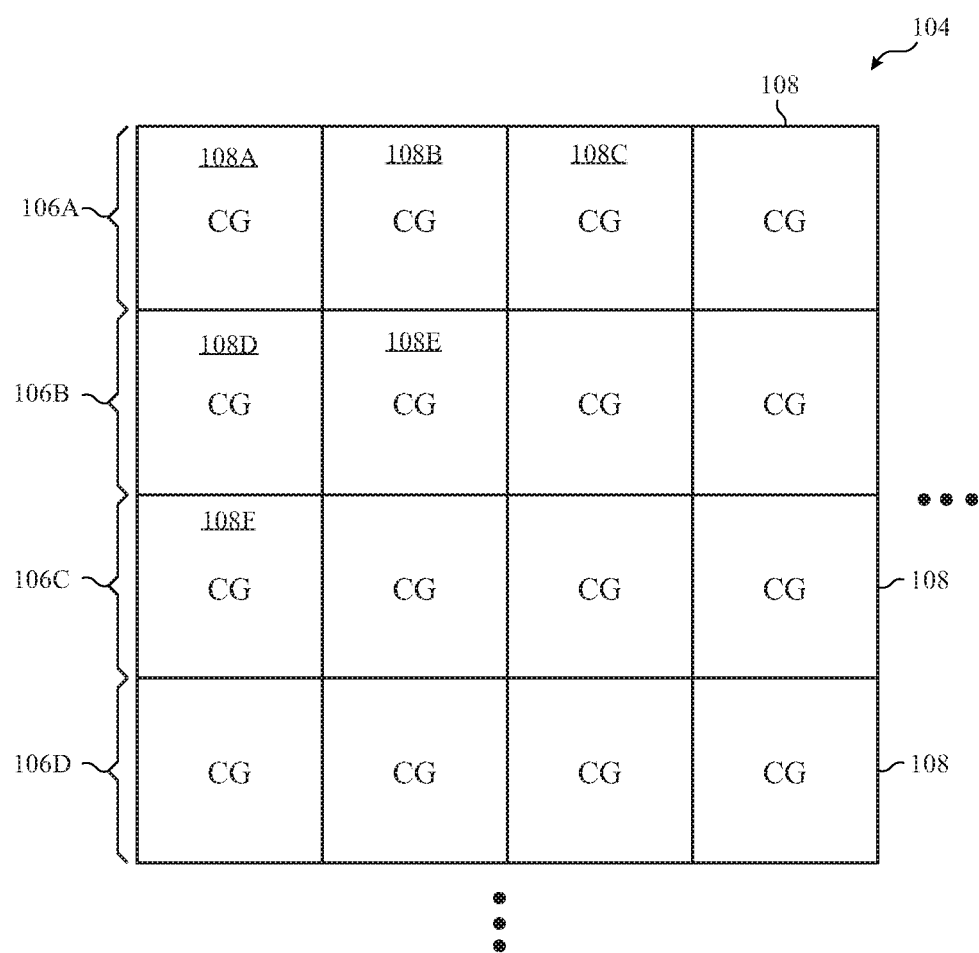
FIG. 10 is a diagrammatic representation of coding groups processed by the transcode pipeline of FIG. 7, in accordance with an embodiment of the present disclosure.

To help illustrate, a diagrammatic representation of a portion 104 of an image frame including rows 106 of coding groups 108 is shown in FIG. 10. In particular, a first row 106A may be row 0, a second row 106B may be row 1, a third row 106C may be row 2, and a fourth row 106D may be row 3. Thus, when first bins corresponding with the first row 106A of coding groups 108 are determined, the first read block 61A may read the first bins from the external storage device 60 into the first transcode engine 58A. On the other hand, when second bins corresponding with the second row 106B of coding groups 108 are determined, the second read block 61B may read the second bins from the external storage device 60 into the second transcode engine 58B.

Returning to the process 88 of FIG. 9, the controller 42 may instruct the transcode pipeline 50 to determine whether both the first transcode engine 58A and the second transcode engine 58B are busy (decision block 98). In some embodiments, the transcode pipeline 50 may determine whether a transcode engine 58 is busy based at least in part on whether a corresponding entropy encoding block 64 is operating to entropy encode bins. Additionally, when both are busy, the controller 42 may instruct the transcode pipeline 50 to pause retrieval of subsequent portions of the bin stream (arrow 100).

On the other hand, the controller 42 may instruct the transcode pipeline 50 to determine a portion of the bin stream corresponding to a next coding group row when both are not busy (arrow 102). For example, with regard to FIG. 10, the transcode pipeline 50 may wait to retrieve third bins corresponding with the third row 106C of coding groups while the first transcode engine 58A is processing the first bins and the second transcode engine 58B is processing the second bins. Since entropy encoding the second bins may be dependent on entropy encoding of the first bins, the first transcode engine 58A may generally complete entropy encoding the first row 106A before the second transcode engine 58B completes entropy encoding the second row 106B.

After the first transcode engine 58A completes entropy encoding the first row 106A, the first read block 61A may read third bins corresponding with the third row 106C of coding groups 108 from the external storage device 60. Additionally, since entropy encoding the third bins may be dependent on entropy encoding of the second bins, the second transcode engine 58B may generally complete entropy encoding the second row 106B before the first transcode engine 58A completes entropy encoding the third row 106C. Thus, after the second transcode engine 58B completes entropy encoding the second row 106B, the second read block 61B may read fourth bins corresponding with the fourth row 106D of coding groups 108 from the external storage device 60.

In this manner, portions of a bin stream corresponding to even coding group rows may be routed to the first transcode engine 58A and portions of the bin stream corresponding to odd coding group rows may be routed to the second transcode engines 58B. It should be appreciated that the described routing scheme is merely intended to be illustrative. In other embodiments, any suitable routing schemes may be implemented. For example, in some embodiments, bins corresponding to a first portion of a coding group row may be routed to the first transcode engine 58A and bins corresponding to a second portion of the coding group row may be routed to the second transcode engine 58B. Additionally, when a transcode pipeline 50 includes N transcode engines 58, each of a set of N adjacent coding group rows may be routed to a different one of the N transcode engines 58.

Returning to the process 78 of FIG. 8, the controller 42 may instruct the transcode pipeline 50 to generate multiple bit streams relatively in parallel (process block 84). As described above, in some embodiments, a transcode engine 58 may use a parser block 62 to identify one or more bins corresponding to each symbol and an entropy encoding block 64 to generate a bit stream by entropy encoding the bins. Thus, by utilizing multiple transcode engines 58, the transcode pipeline 50 may generate multiple bit streams relatively in parallel. For example, the first transcode engine 58A may generate a first bit stream corresponding to even coding group rows and the second transcode engine 58B may generate a second bit stream corresponding to odd coding group rows relatively in parallel.

However, as described above, entropy encoding a coding group may be dependent on processing of other (e.g., neighbor) coding groups. As such, to enable entropy encoding utilizing multiple transcode engines 58 relatively in parallel, adjustments may be made to the transcode pipeline 50, for example, to facilitate data communication between transcode engines 58 and/or to facilitate determining a combined bit stream. In fact, in some embodiments, operation of different transcode engines 58 may vary to facilitate interoperability. For example, operation of the first transcode engine 58A and the second transcode engine 58B may vary.

Figure 11:
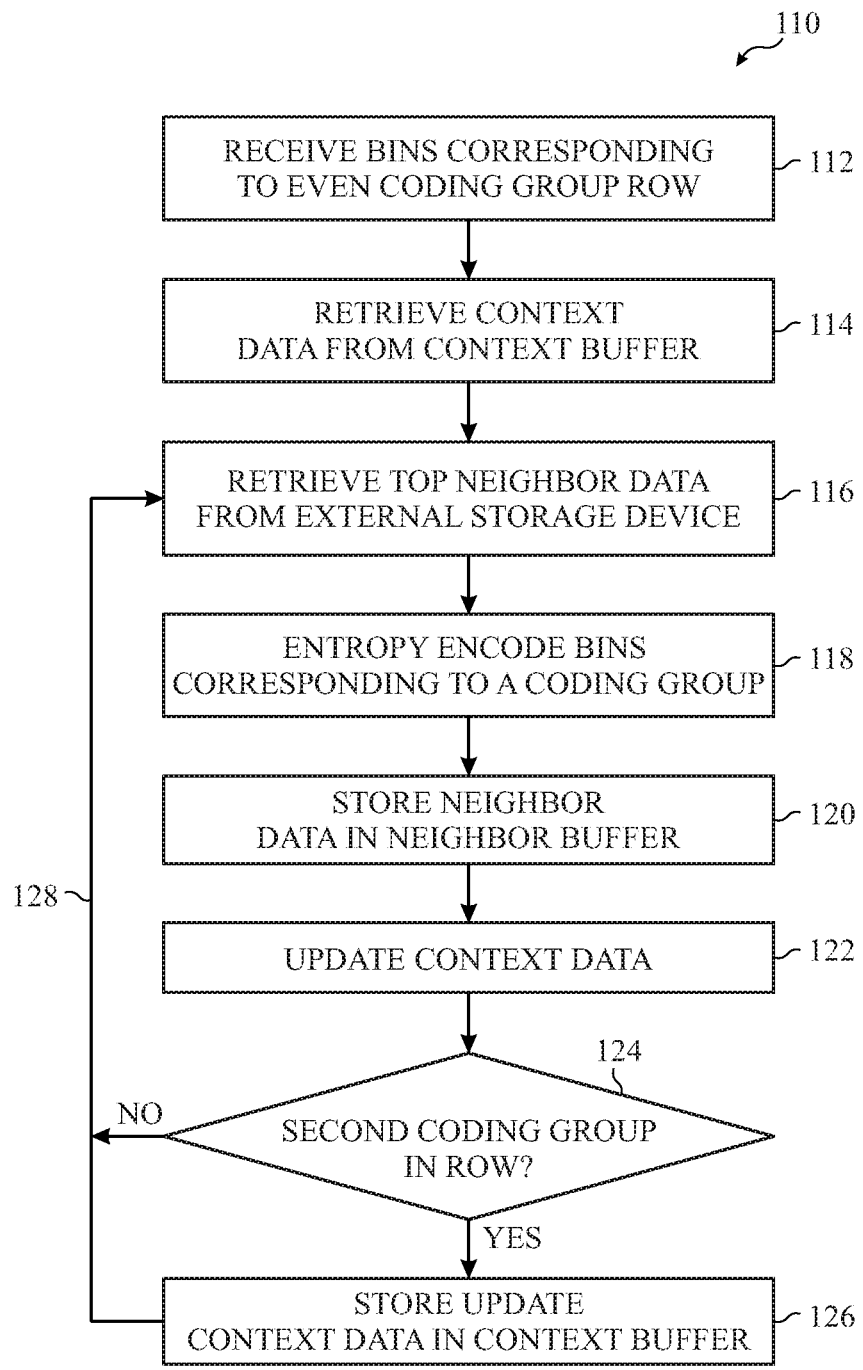
FIG. 11 is a flow diagram of a process for operating an even row transcode engine in the transcode pipeline of FIG. 7, in accordance with an embodiment of the present disclosure.

To help illustrate, one embodiment of a process 110 for operating the first transcode engine 58A is described in FIG. 11. Generally, the process 110 includes receiving bins corresponding to an even coding group row (process block 112), retrieving context data from a context buffer (process block 114), retrieving top neighbor data from an external storage device (process block 116), entropy encoding bins corresponding to a coding group (process block 118), storing neighbor data in a neighbor buffer (process block 120), updating context data (process block 122), determining whether the coding group is a second coding group in the coding group row (decision block 124), and storing updated context data in the context buffer when the coding group is the second coding group (process block 126). In some embodiments, the process 110 may be implemented based on circuit connections formed in the video encoding pipeline 36 and/or the transcode pipeline 50. Additionally or alternatively, in some embodiments, the process 110 may be implemented by executing instructions stored in a tangible, non-transitory, computer-readable medium, such as the controller memory 46, using a processor, such as the controller processor 44.

Accordingly, in some embodiments, the controller 42 may instruct the first transcode engine 58A to retrieve bins corresponding with an even coding group row (process block 112). As described above, entropy encoding a coding group may be performed based at least in part on context data (e.g., tables or models). Thus, the controller 42 may instruct the first transcode engine 58A to retrieve context data from the context buffer 70 before processing the even coding group row (process block 114). In some embodiments, the context data may be stored in the context buffer 70 based at least in part on entropy encoding previous coding groups, for example, in a top neighboring coding group row by the second transcode engine 58B. As described above, initializing the first transcode engine 58A with context data updated based at least in part on entropy encoding of previous coding groups may facilitate improving encoding efficiency. However, when the even coding group row is the first coding group row in a context, the first transcode engine 58A may be initialized with default context data.

Additionally, as described above, entropy encoding a coding group may be performed based at least in part on neighbor data. Thus, the controller 42 may instruct the first transcode engine 58A to retrieve top neighbor data from the external storage device 60 (process block 116). In some embodiments, the top neighbor data may be stored in the external storage device 60 based at least in part on processing a top neighboring coding group row, for example, by the second transcode engine 58B. In some embodiments, the top neighbor data may include split flags, skip flags, and/or a slice identifier determined for each coding group in the top neighboring coding group row. However, when the even coding group row is the first coding group row in an image frame, the first transcode engine 58A may be initialized without top neighbor data.

Based at least in part on the context data and/or the neighbor data, the controller 42 may instruct the first transcode engine 58A to entropy encode bins corresponding to a coding group in the even coding group row (process block 118). As described above, the first transcode engine 58A may entropy encode the bins to generate encoded bits, which may each represent one or more bins. Additionally, as described above, the entropy encoding applied by a transcode engine 58 may vary based at least in part on context data and/or neighbor data. As such, the encoded bits generated by the first transcode engine 58A may vary when applying different context data and, thus, different bin probabilities. Additionally, the encoded bits generated by the first transcode engine 58A may vary when neighbor data indicates that a neighbor coding group is in the same slice compared to when the neighbor coding group is in a different slice.

Thus, to facilitate entropy encoding subsequent coding groups, the controller 42 may instruct the first transcode engine 58A to determine and store neighbor data in the neighbor buffer 72 (process block 120). Additionally, the controller 42 may instruct the first transcode engine 58A to update context data based at least in part on entropy encoding the coding group (process block 122). In some embodiments, the first transcode engine 58A may update the context data by adjusting bin probabilities based at least in part on the bins encountered while entropy encoding the coding group.

As described above, the updated context data may be used to facilitate improving encoding efficiency of subsequent coding groups. For example, the updated context data may be used to entropy encode subsequent coding groups in the even coding group row. Additionally, the updated context data may be used to entropy encode a subsequent (e.g., odd) coding group row. For example, to facilitate wavefront parallel processing (WPP), the context data updated after entropy encoding two coding groups in a coding group row may be used to entropy encode a next (e.g., bottom neighbor) coding group row.

Thus, the controller 42 may instruct the first transcode engine 58A to determine whether the coding group is the second coding group in the even coding group row (decision block 124). In some embodiments, the first transcode engine 58A may utilize a first (e.g., even) coding group counter to facilitate keeping track of coding units in the even coding group row. For example, the first transcode engine 58A may reset counter value at the start of an even coding group row and increment the counter value after entropy encoding each coding group. Thus, the first transcode engine 58A may determine that the coding group is the second coding group in the even coding group row when the counter value is incremented to two, thereby indicating that two coding groups have been entropy encoded.

When the second coding group, the controller 42 may instruct the first transcode engine 58A to store the updated context data in the context buffer 70 (process block 126). In this manner, as described above, the second transcode engine 58B may retrieve and initialize based at least in part on the updated context data before entropy encoding a subsequent odd coding group row. Moreover, by communicating the updated context data after entropy encoding two coding groups, the first transcode engine 58A may facilitate implementing wavefront parallel processing since the second transcode engine 58B may wait for the updated context data before entropy encoding the subsequent odd coding group row, thereby resulting in the second transcode engine 58B lagging at least two coding groups behind the first transcode engine 58A.

On the other hand, when not the second coding group, the controller 42 may instruct the first transcode engine 58A to encode a next subsequent coding group in the even coding group row (arrow 128). In particular, the first transcode engine 58A may entropy encode the next subsequent coding group based at least in part on the updated context data determined by processing the directly previous coding group, left neighbor data determined by processing the directly previous coding group, and/or top neighbor data, for example, determined by the second transcode engine 58B based on processing a top neighbor coding group and stored in the external storage device 60.

In this manner, the first transcode engine 58A may successively entropy encode each coding group in the even coding group row. In some embodiments, since number of coding groups in each coding group row may be known, the first transcode engine 58A may use the first coding group counter to facilitate determining when entropy encoding of the even coding group row has been completed. Additionally, in a similar manner, the first transcode engine 58A may entropy encode each of the other even coding group rows in an image frame, thereby generating and storing a first bit stream, for example, in a first portion of the external storage device 60.

Figure 12:
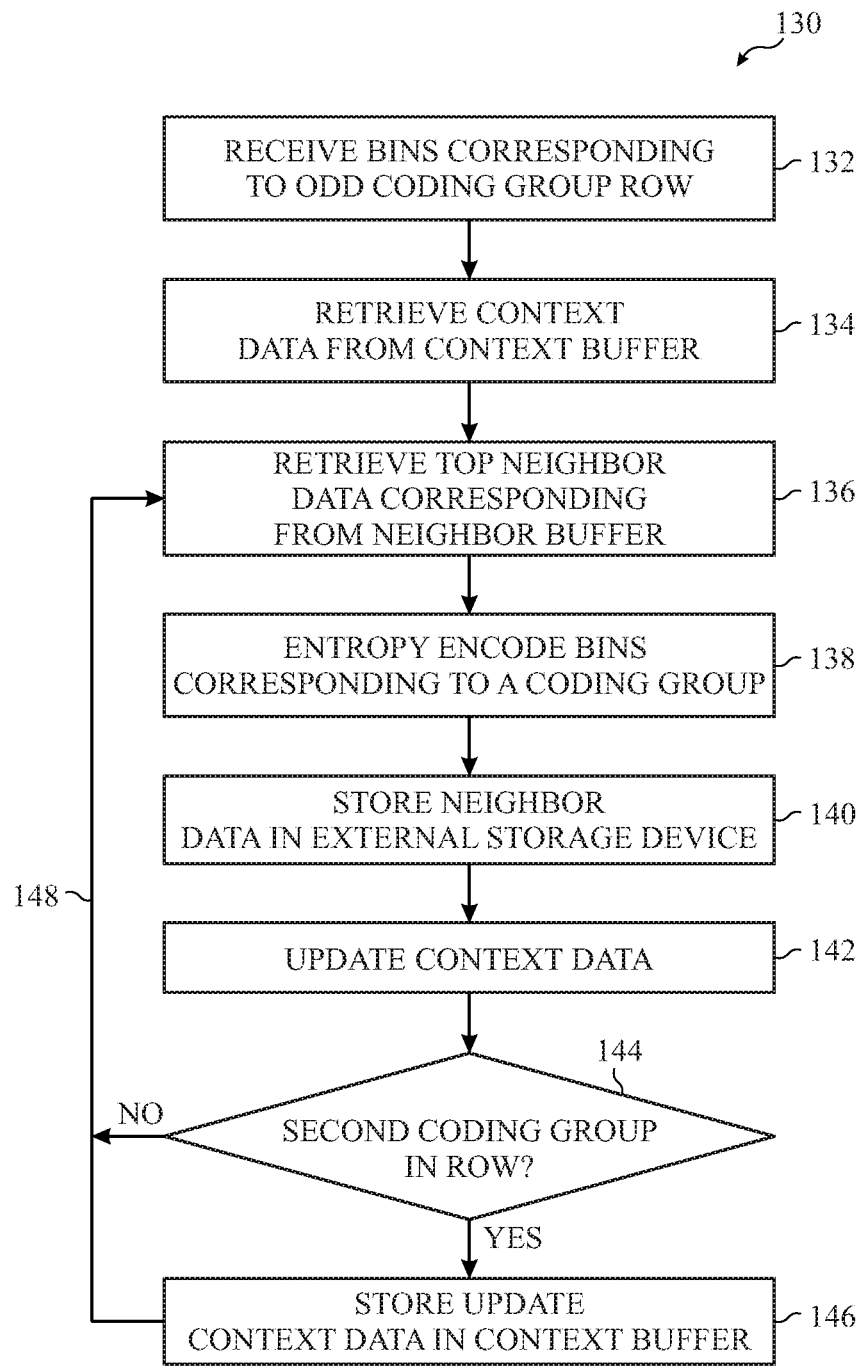
FIG. 12 is a flow diagram of a process for operating an odd row transcode engine in the transcode pipeline of FIG. 7, in accordance with an embodiment of the present disclosure.

On the other hand, one embodiment of a process 130 for operating the second transcode engine 58B is described in FIG. 12. Generally, the process 130 includes receiving bins corresponding to an odd coding group row (process block 132), retrieving context data from a context buffer (process block 134), retrieving top neighbor data from a neighbor buffer (process block 136), entropy encoding bins corresponding to a coding group (process block 138), storing neighbor data in an external storage device (process block 140), updating context data (process block 142), determining whether the coding group is a second coding group in the coding group row (decision block 144), and storing updated context data in the context buffer when the coding group is the second coding group (process block 146). In some embodiments, the process 130 may be implemented based on circuit connections formed in the video encoding pipeline 36 and/or the transcode pipeline 50. Additionally or alternatively, in some embodiments, the process 130 may be implemented by executing instructions stored in a tangible, non-transitory, computer-readable medium, such as the controller memory 46, using a processor, such as the controller processor 44.

Accordingly, in some embodiments, the controller 42 may instruct the second transcode engine 58B to retrieve bins corresponding with an odd coding group row (process block 132). As described above, entropy encoding a coding group may be performed based at least in part on context data (e.g., tables or models). Thus, the controller 42 may instruct the second transcode engine 58B to retrieve context data from the context buffer 70 before processing the odd coding group row (process block 134). In some embodiments, the context data may be stored in the context buffer 70 based at least in part on entropy encoding previous coding groups, for example, in a top neighboring coding group row by the first transcode engine 58A. As described above, initializing the second transcode engine 58B with context data updated based at least in part on entropy encoding of previous coding groups may facilitate improving encoding efficiency. However, when the odd coding group row is the first coding group row in a context, the second transcode engine 58B may be initialized with default context data.

Additionally, as described above, entropy encoding a coding group may be performed based at least in part on neighbor data. Thus, the controller 42 may instruct the second transcode engine 58B to retrieve top neighbor data from the neighbor buffer 72 (process block 136). In some embodiments, the top neighbor data may be stored in the neighbor buffer 72 based at least in part on entropy encoding a top neighboring coding group row, for example, by the first transcode engine 58A. In some embodiments, the top neighbor data may include split flags, skip flags, and/or a slice identifier determined for each coding group in the top neighboring coding group row.

Based at least in part on the context data and/or the neighbor data, the controller 42 may instruct the second transcode engine 58B to entropy encode bins corresponding to a coding group in the odd coding group row (process block 138). As described above, the second transcode engine 58B may entropy encode the bins to generate encoded bits, which may each represent one or more bins. Additionally, as described above, the entropy encoding applied by a transcode engine 58 may vary based at least in part on context data and/or neighbor data.

Thus, to facilitate entropy encoding subsequent coding groups, the controller 42 may instruct the second transcode engine 58B to determine and store neighbor data in the external storage device 60 (process block 140). Additionally, the controller 42 may instruct the second transcode engine 58B to update context data based at least in part on entropy encoding the coding group (process block 142). In some embodiments, the second transcode engine 58B may update the context data by adjusting bin probabilities based at least in part on the bins encountered while entropy encoding the coding group.

To facilitate improving encoding efficiency of subsequent coding groups, the controller 42 may instruct the second transcode engine 58B to determine whether the coding group is the second coding group in the odd coding group row (decision block 144). In some embodiments, the second transcode engine 58B may utilize a second (e.g., odd) coding group counter to facilitate keeping track of coding units in the odd coding group row. For example, the second transcode engine 58B may reset counter value at the start of an odd coding group row and increment the counter value after entropy encoding each coding group. Thus, the second transcode engine 58B may determine that the coding group is the second coding group in the odd coding group row when the counter value is incremented to two, thereby indicating that two coding groups have been entropy encoded.

When the second coding group, the controller 42 may instruct the second transcode engine 58B to store the updated context data in the context buffer 70 (process block 146). In this manner, as described above, the first transcode engine 58A may retrieve the updated context data and initialize accordingly before entropy encoding a subsequent even coding group row. Moreover, by communicating the updated context data after entropy encoding two coding groups, the second transcode engine 58B may facilitate implementing wavefront parallel processing since the first transcode engine 58A may wait for the update context data before entropy encoding the subsequent even coding group row, thereby resulting in the first transcode engine 58A lagging at least two coding groups behind the second transcode engine 58B.

On the other hand, when not the second coding group, the controller 42 may instruct the second transcode engine 58B to encode a next subsequent coding group in the even coding group row (arrow 148). In particular, the second transcode engine 58B may entropy encode the next subsequent coding group row based at least in part on the updated context data determined by processing the directly previous coding group, left neighbor data determined by processing the directly previous coding group, and/or top neighbor data, for example, determined by the first transcode engine 58A based on processing a top neighbor coding group and stored in the neighbor buffer 72.

In this manner, the second transcode engine 58B may successively entropy encode each coding group in the odd coding group row. In some embodiments, since number of coding groups in each coding group row may be known, the second transcode engine 58B may use the second coding group counter to facilitate determining when entropy encoding of the odd coding group row has been completed. Additionally, in a similar manner, the second transcode engine 58B may entropy encode each of the other odd coding group rows in an image frame, thereby generating and storing a second bit stream, for example, in a second portion of the external storage device 60.

As illustrated in the process 110 of FIG. 11 and process 130 of FIG. 12, although relatively similar, operation of the first transcode engine 58A and the second transcode engine 58B differ in handling of neighbor data. In particular, the first transcode engine 58A may retrieve top neighbor data from the external storage device 60 and store neighbor data in the neighbor buffer 72. On the other hand, the second transcode engine 58B may retrieve top neighbor data from the neighbor buffer 72 and store neighbor data in the external storage device 60.

In some embodiments, handling of neighbor data may differ due at least in part to expected operation of the first transcode engine 58A and the second transcode engine 58B. In particular, although slightly lagging, the second transcode engine 58B may operate relatively in parallel with the first transcode engine 58A. To help illustrate, with reference to FIG. 10, the first transcode engine 58A may process the first row 106A by entropy encoding a first coding group 108A based at least in part on default context data. Based at least in part on processing the first coding group 108A, the first transcode engine 58A may determine updated context data and neighbor data, which may be used to subsequently entropy encode a second coding group 108B. Based at least in part on processing the second coding group 108B, the first transcode engine 58A may determine updated context data and left neighbor data, which may be used to subsequently entropy encode a third coding group 108C. In a similar manner, the first transcode engine 58A may successively entropy encode each coding group 108 in the first row 106A.

Additionally, the second transcode engine 58B may process the second row 106B by entropy encoding a fourth coding group 108D based at least in part on top neighbor data determined by entropy encoding the first coding group 108A and updated context data determined by entropy encoding the second coding group 108B. As such, the second transcode engine 58B may begin entropy encoding the fourth coding group 108D after the first transcode engine 58A completes entropy encoding the second coding group 108B. Based at least in part on processing the first coding group 108A, the second transcode engine 58B may determine updated context data and neighbor data, which along with top neighbor data determined by processing the second coding group 108B may be used to subsequently entropy encode a fifth coding group 108E. In a similar manner, the second transcode engine 58B may successively entropy encode each coding group 108 in the second row 106B.

Thus, the first transcode engine 58A may entropy encode the first row 106A and the second transcode engine 58B may entropy encode the second row 106B relatively in parallel. For example, the second transcode engine 58B may entropy encode the fourth coding group 108D while the first transcode engine 58C entropy encodes the third coding group 108C. Since operating relatively in parallel, duration between when the first transcode engine 58A entropy encode a top neighbor coding group (e.g., first coding group 108A) and when the second transcode engine 58B entropy encodes a bottom neighbor coding group (e.g., fourth coding group 108D) may be relatively short. As such, the first transcode engine 58A may store neighbor data in the neighbor buffer 72 to facilitate reducing latency and, thus, likelihood in causing a bottleneck in throughput of the transcode pipeline 50.

After completing the first row 106A, the first transcode engine 58A may process the third row 106C by entropy encoding a sixth coding group 108F based at least in part on top neighbor data determined by entropy encoding the fourth coding group 108D and updated context data determined by entropy encoding the fifth coding group 108E. As such, the first transcode engine 58A may begin entropy encoding the sixth coding group 108F after the second transcode engine 58B completes entropy encoding the fifth coding group 108E. Since the third row 106C is processed after completing the first row 106A and the first row 106A is processed relatively in parallel with the second row 106B, duration between when the second transcode engine 58B entropy encode a top neighbor coding group (e.g., fourth coding group 108D) and when the first transcode engine 58A entropy encodes a bottom neighbor coding group (e.g., sixth coding group 108F) may be relatively longer. As such, the first transcode engine 58A may store neighbor data in the external storage device 60 to facilitate reducing storage size of the neighbor buffer 72 and, thus, implementation associated cost, such as component count and/or component size.

Nevertheless, in some embodiments, each transcode engine 58 may communicate neighbor data using the neighbor buffer 72. For example, additionally or alternatively, the second transcode engine 58B may store neighbor data in the neighbor buffer 72 and the first transcode engine 58A may retrieve top neighbor data from the neighbor buffer 72. Furthermore, in some embodiments, each transcode engine 58 may communicate neighbor data using the external storage device 60. For example, additionally or alternatively, the first transcode engine 58A may store neighbor data in external storage device 60 and the second transcode engine 58B may retrieve top neighbor data from the external storage device 60. In any case, the transcode pipeline 50 may utilize multiple transcode engines 58 to generate multiple bit streams relatively in parallel.

Returning to the process 78 of FIG. 8, the controller 42 may instruct the transcode pipeline 50 to determine characteristic data that indicates characteristics of the multiple bit streams (process block 86). As described above, the characteristics may facilitate generating a combined bit stream by stitching together the multiple bit streams. In other words, the characteristics may describe organizational relationship of the multiple bit stream in the combined bit stream. For example, the characteristic data may include position data that indicates position (e.g., location) of header data, beginning of a slice, end of a slice, beginning of a coding group row, end of a coding group row, beginning of a group of coding groups, end of a group of coding groups, beginning of a coding group, and/or end of a coding group in a bit stream. Additionally or alternatively, the characteristic data may include size data that indicates size (e.g., number of bits) of a slice, a coding group row, a group of coding groups, and/or a coding group in a bit stream.

Figure 13:
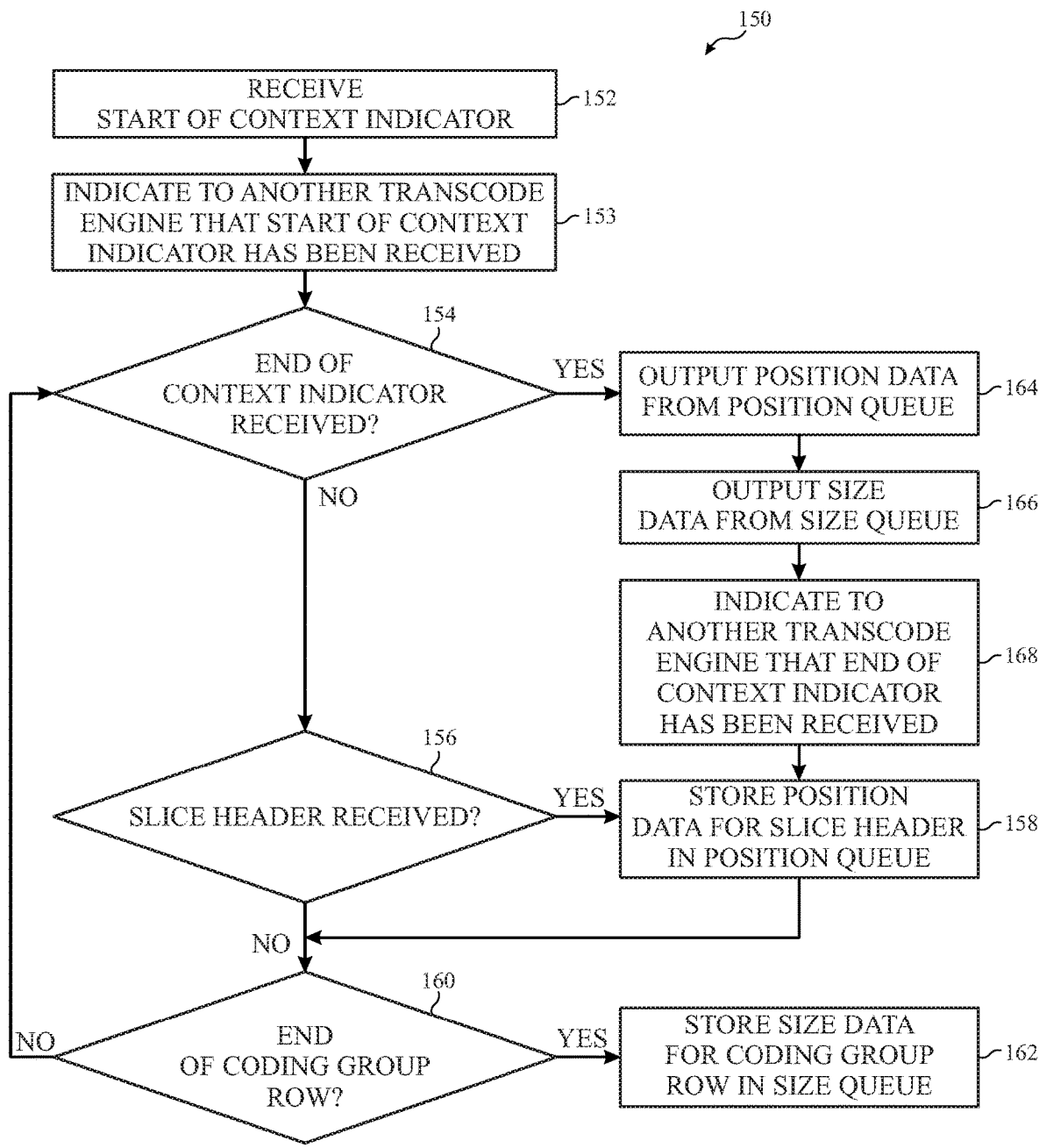
FIG. 13 is a flow diagram of a process for determining characteristics of bit streams determined by the transcode pipeline of FIG. 7, in accordance with an embodiment of the present disclosure.

To help illustrate, one embodiment of a process 150 for operating one of multiple transcode engines 58 to determine characteristic data for a generated bit stream is described in FIG. 13. Generally, the process 150 includes receiving a start of context indicator (process block 152), indicating to another transcode engine that the start of context indicator has been received (process block 153), determining whether an end of context indicator has been received (decision block 154), determining whether a slice header has been received when the end of context indicator has not been received (decision block 156), storing position data for the slice header in a position queue when the slice header has been received (process block 158), determining whether end of a coding group row has been reached (decision block 160), and storing size data for the coding group row when the end of the coding group row has been reached (process block 162). Additionally, when the end of context indicator has been received, the process 150 includes outputting position data from the position queue (process block 164), outputting size data from the size queue (process block 166), and indicating to another transcode engine that the end of context indicator has been received (process block 168). In some embodiments, the process 150 may be implemented based on circuit connections formed in the video encoding pipeline 36 and/or the transcode pipeline 50. Additionally or alternatively, in some embodiments, the process 150 may be implemented by executing instructions stored in a tangible, non-transitory, computer-readable medium, such as the controller memory 46, using a processor, such as the controller processor 44.

Accordingly, in some embodiments, the controller 42 may instruct a transcode engine 58 to retrieve bins that include a start of context indicator (process block 152). In some embodiments, the start of context indicator may indicate that following coding groups should be entropy encoded using context data (e.g., table or model), which may be updated as the coding groups are processed. Additionally, in some embodiments, the transcode engine 58 may clear the size queue 76, clear the position queue 74, and/or reset a bit counter used to determine size data and/or position data when the start of context indicator has been received.

Since the main pipeline 48 may generate a single bin stream, the start of context indicator may be received by one transcode engine 58. As such, when the start of context indicator is received, the transcode engine 58 may communicate as much to other one or more transcode engines 58 in the transcode pipeline 50 (process block 153). In this manner, the other one or more transcode engines 58 may operate accordingly, for example, by clearing the size queue 76, clearing the position queue 74, and/or resetting a bit counter.

Additionally, before an end of context indicator has been received, the controller 42 may instruct the transcode engine 58 to determine whether a slice header has been received (decision block 156). In some embodiments, the transcode engine 58 may determine whether a slice header has been received by parsing the received bins. Additionally, in some embodiments, the transcode engine 58 may increment a bit counter each time an encoded bit is generate by the transcode engine 58.

Each time a slice header has been received, the controller 42 may instruct the transcode engine 58 to store position data corresponding with the slice header in the position queue 74 (process block 158). In some embodiments, the position data may indicate byte position (e.g., location) of the slice header in a bit stream generated by a transcode engine 58. Thus, in some embodiments, the transcode engine 58 may determine the position data based at least in part on the bit counter. For example, the transcode engine 58 may determine position data, which indicates that the slice header is five bytes after the start of context indicator when the counter value of the bit counter is forty. Additionally or alternatively, the transcoder engine 58 may determine and store other position data in a similar manner.

Furthermore, before an end of context indicator has been received, the controller 42 may instruct the transcode engine 58 to determine whether the end of a coding group row has been reached (decision block 160). As described above, in some embodiments, a transcode engine 58 may include a coding group counter to facilitate keeping track of entropy encoding progress in a coding group row. In such embodiments, the transcode engine 58 may determine that the end of a coding group row has been reached when the counter value of the coding group counter is incremented to an expected number of coding groups in the coding group row. Additionally or alternatively, the transcode engine 58 may determine that the end of a coding group row has been reached when switching to a portion of the bin stream corresponding with another coding group row.

Each time the end of a coding group row has been reached, the controller 42 may instruct the transcode pipeline to store size data corresponding with the coding group row in the size queue 76 (process block 162). In some embodiments, the size data may indicate number of bits used to indicate a coding group row. Thus, in some embodiments, the transcode engine 58 may determine the size data based at least in part on counter value of the bit counter at the beginning of a coding group row and at the end of the coding group row. For example, the transcode engine 58 may determine size data, which indicates that size of the coding group row is ten bits when counter value of the bit counter is twenty at the beginning of the coding group row and thirty at the end of the coding group row. Additionally or alternatively, the transcoder engine 58 may determine and store other size data in a similar manner.

Since the main pipeline 48 may generate a single bin stream, the end of context indicator may also be received by one transcode engine 58. As such, when the end of context indicator is received, the transcode engine 58 may communicate as much to the other one or more transcode engines 58 in the transcode pipeline 50 (process block 168). In this manner, each of the multiple transcode engines 58 may operate accordingly.

For example, the transcode engines 58 may output position data from the position queue 74 (process block 164). In some embodiments, the position data may be output by storing the position data in the external storage device 60, for example, via write direct memory access. Additionally, the transcode engines 58 may output size data from the size queue 76 (process block 166). In some embodiments, the size data may be output by storing the size data in the external storage device 60, for example, via write direct memory access. In this manner, the transcode pipeline 50 may determine and communicate characteristic data corresponding to each of multiple bit stream, which, as described above, may facilitate determining a combined bit stream.

Figure 14:
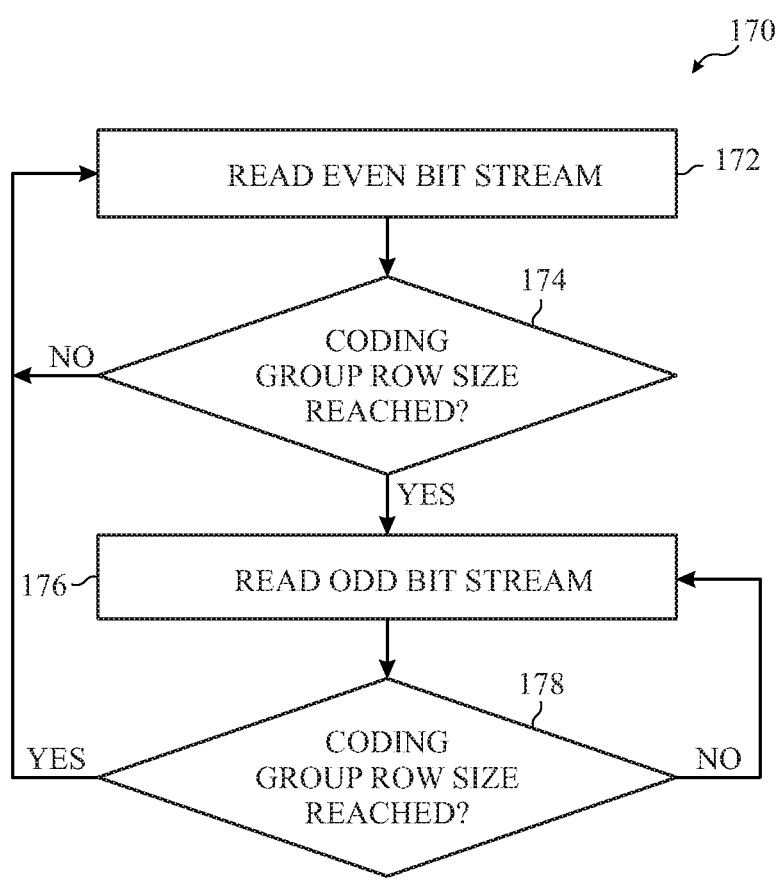
FIG. 14 is a flow diagram of a process for generating a combined bit stream based at least in part on the of bit streams determined by the transcode pipeline of FIG. 7, in accordance with an embodiment of the present disclosure.

To help illustrate, one embodiment of a process 170 for determining a combined bit stream is described in FIG. 14. Generally, the process 170 includes reading an even bit stream (process block 172), determining whether coding group row size of an even coding group row has been reached (decision block 174), reading an odd bit stream when the coding group row size of the even coding group row has been reached (process block 176), and determining whether coding group size of an odd coding group row has been reached (decision block 174). In some embodiments, the process 170 may be implemented by executing instructions stored in a tangible, non-transitory, computer-readable medium, such as the controller memory 46, using a processor, such as the controller processor 44.

Accordingly, in some embodiments, the controller 42 may instruct the external storage device 60 to read an even bit stream (process block 172). As described above, in some embodiments, the even bit stream may be generated by the first transcode engine 58A and stored in a first portion of the external storage device 60. Thus, in some embodiments, the external storage device 60 may read the even bit stream based at least in part on location of the first portion in the external storage device 60.

Additionally, the controller 42 may instruct the external storage device 60 to continue reading the even bit stream until size of a corresponding even coding group row is reached (decision block 174). Thus, in some embodiments, the external storage device 60 may read the even bit stream based at least in part on size data. For example, the external storage device 60 may include a bit counter that increments each time a bit is read. As such, the external storage device 60 may determine that the end of the corresponding even coding group row is reached when counter value of the bit counter is equal to size data that that indicates size of the even coding group row.

When size of the corresponding even coding group row is reached, the controller 42 may instruct the external storage device to read an odd bit stream (process block 176). As described above, in some embodiments, the odd bit stream may be generated by the second transcode engine 58B and stored in a second portion of the external storage device 60. Thus, in some embodiments, the external storage device 60 may read the odd bit stream based at least in part on location of the second portion in the external storage device 60.

Additionally, the controller 42 may instruct the external storage device 60 to continue reading the odd bit stream until size of a corresponding odd coding group row is reached (decision block 178). Thus, in some embodiments, the external storage device 60 may read the odd bit stream based at least in part on size data. For example, the external storage device 60 may determine that the end of the corresponding odd coding group row is reached when the counter value of the bit counter is equal to size data that indicates size of the odd coding group row.

In this manner, the combined bit stream may be determined by alternating between multiple bit streams based at least on associated characteristics determined by the transcode engines 58. In addition to coding group row size data, other size data and/or position data may facilitate determining the combined bit stream. For example, the external storage device 60 may read a portion of the combined bit stream corresponding to a slice based at least in part on position data that indicates position of a slice header and/or size data that indicates size of the slice. In this manner, the combined bit stream may be generated to facilitate compatibility, for example, with a decoding device that expects to receive a single bit stream.

Accordingly, the technical effects of the present disclosure include facilitating improved output rate of encoded image data, for example, to facilitate real-time or near real-time display and/or transmission. In particular, output rate may be improved by utilizing multiple transcode engines to entropy encode different coding groups relatively in parallel. However, since entropy encoding some coding groups may be interrelated, data communication may be provided between the multiple transcode engines. For example, in some embodiments, a neighbor buffer may facilitate communication of neighbor data (e.g., split flags, skip flags, and/or slice identifiers) between multiple transcode engines. Additionally, in some embodiments, a context buffer may facilitate communication of context data (e.g., models or tables) between multiple transcode engines. Furthermore, to facilitate compatibility with an output (e.g., decoding) device, each of the multiple transcode engines may determine characteristic data that indicates organization relationship of multiple bit stream in a combined bit stream, which is supplied to the output device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. Video encoding pipeline circuitry configured to:
   entropy encode a first portion of a bin stream to determine a first bit stream comprising first encoded image data that indicates a first coding group row in an image frame; and
   entropy encode a second portion of the bin stream to determine a second bit stream comprising second encoded image data that indicates a second coding group row in the image frame while entropy encoding the first portion of the bin stream.

2. The video encoding pipeline circuitry of claim 1, comprising a first transcode engine and a second transcode engine, wherein:
   the first transcode engine is configured to entropy encode the first portion of the bin stream; and
   the second transcode engine is configured to entropy encode the second portion of the bin stream while the first transcode engine entropy encodes the first portion of the bin stream.

3. The video encoding pipeline circuitry of claim 2, wherein the first transcode engine is configured to:
   entropy encode a first coding group in the first coding group row based at least in part on context data;
   determine first neighbor data and first updated context data based at least in part on entropy encoding of the first coding group;
   entropy encode a second coding group in the first coding group row based at least in part on the first neighbor data and the first updated context data; and
   determine second neighbor data and second updated context data based at least in part on entropy encoding of the second coding group.

4. The video encoding pipeline circuitry of claim 3, wherein the second transcode engine is configured to entropy encode a third coding group in the second coding group row based at least in part on the first neighbor data and the second updated context data.

5. The video encoding pipeline circuitry of claim 4, wherein the second transcode engine is configured to:
   determine third neighbor data and third updated context data based at least in part on entropy encoding the third coding group; and
   entropy encode a fourth coding group in the second coding group row based at least in part on the second neighbor data, the third neighbor data, and the third updated context data.

6. The video encoding pipeline circuitry of claim 2, wherein the first coding group row, second coding group row, or both comprise a row of coding tree units, coding units, or macroblocks.

7. The video encoding pipeline circuitry of claim 2, comprising a transcode pipeline that includes the first transcode engine and the second transcode engine, wherein the transcode pipeline is configured to:
  retrieve the bin stream from a storage device via read direct memory access;
  store the first bit stream in one portion of the storage device; and
  store the second bit stream in a different portion of the storage device.

8. The video encoding pipeline circuitry of claim 7, comprising a first pipeline communicatively coupled to the storage device, wherein the first pipeline is configured to determine the bin stream and store the bin stream in the storage device.

9. An electronic device comprising a video encoding pipeline configured to encode source image data, wherein the video encoding pipeline comprises:
  a first transcode engine configured to entropy encode a first portion of a bin stream to determine a first bit stream comprising first encoded image data that indicates a first coding group row in an image frame; and
  a second transcode engine configured to entropy encode a second portion of the bin stream to determine a second bit stream comprising second encoded image data that indicates a second coding group row in the image frame while the first transcode engine entropy encodes the first portion of the bin stream.

10. The electronic device of claim 9, wherein:
  the first transcode engine is configured to determine first characteristic data corresponding to the first bit stream to facilitate communicating a combined bit stream to a decoding device; and
  the second transcode engine is configured to determine second characteristic data corresponding to the second bit stream to facilitate communicating the combined bit stream to the decoding device, wherein the combined bit stream comprises the first bit stream and the second bit stream to facilitate determining decoded image data.

11. The electronic device of claim 10, comprising a first pipeline configured to prediction encode the source image data to determine prediction encoded image data comprising prediction encoding parameters that indicate a coding group with reference to the decoded image data expected to be determined by the decoding device.

12. The electronic device of claim 10, comprising:
  an external storage device communicatively coupled to the first transcode engine and the second transcode engine; and
  a data buffer communicatively coupled to the first transcode engine and the second transcode engine, wherein:
  the first transcode engine is configured to determine first neighbor data and store the first neighbor data and second neighbor data in the data buffer; and
  the second transcode engine is configured to determine the second neighbor data and store the second neighbor data in the external storage device.

13. The electronic device of claim 10, wherein the first characteristic data comprises:
  first size data that indicates size of the first encoded image data in the first bit stream; and
  first position data that indicates byte position of a first slice header in the first bit stream when the first transcode engine detects the first slice header in the first portion of the bin stream.

14. The electronic device of claim 9, comprising a first pipeline configured to determine symbols that indicate prediction encoding parameters used to prediction encode the source image data corresponding with the image frame, filtering parameters to be applied by a decoding device to decoded image data, or both.

15. The electronic device of claim 14, wherein the first pipeline is configured to determine the symbols by binarizing the symbols to generate the bin stream.

16. The electronic device of claim 15, wherein:
  the first transcode engine is configured to entropy encode the first portion of the bin stream by coding a first portion of a single bin stream that indicates a first group of symbols corresponding to a first coding group; and
  the second transcode engine is configured to entropy encode the second portion of the bin stream by coding a second portion of the single bin stream that indicates a second group of symbols corresponding to a second coding group.

17. The electronic device of claim 9, wherein the electronic device comprises a portable phone, a media player, a personal data organizer, a handheld game platform, a watch, a tablet device, a computer, or any combination thereof.

18. A method for operating a video encoding pipeline to generate encoded image data, the method comprising:
  determining, via a first pipeline, symbols that indicate prediction encoding parameters used to prediction encode source image data corresponding with an image frame, filtering parameters to be applied by a decoding device to decoded image data, or both;
  entropy encoding, via a second pipeline, a first group of the symbols corresponding to a first coding group in the image frame to generate first encoded bits; and
  entropy encoding, via the second pipeline and while entropy encoding the first group of the symbols, a second group of symbols corresponding to a second coding group in the image frame to generate second encoded bits.

19. The method of claim 18, comprising generating a single bit stream comprising the first encoded bits and the second encoded bits.

20. The method of claim 19, comprising determining, via the decoding device, the decoded image data based at least in part on the single bit stream.

* * * * *